(12) United States Patent
Kato et al.

(10) Patent No.: US 10,576,538 B2
(45) Date of Patent: Mar. 3, 2020

(54) ALLOY STRUCTURE AND METHOD FOR PRODUCING ALLOY STRUCTURE

(71) Applicant: HITACHI METALS, LTD., Minato-ku (JP)

(72) Inventors: Takahiko Kato, Tokyo (JP); Kousuke Kuwabara, Tokyo (JP); Tadashi Fujieda, Tokyo (JP); Kinya Aota, Tokyo (JP); Isamu Takahashi, Tokyo (JP); Kenji Yamaga, Tokyo (JP); Hiroyuki Satake, Tokyo (JP); Hajime Murakami, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 368 days.

(21) Appl. No.: 15/327,974

(22) PCT Filed: Jul. 17, 2015

(86) PCT No.: PCT/JP2015/070471
§ 371 (c)(1),
(2) Date: Jan. 20, 2017

(87) PCT Pub. No.: WO2016/013497
PCT Pub. Date: Jan. 28, 2016

(65) Prior Publication Data
US 2017/0209922 A1    Jul. 27, 2017

(30) Foreign Application Priority Data
Jul. 23, 2014  (JP) .................................. 2014-150027
Jul. 25, 2014  (JP) .................................. 2014-151334

(51) Int. Cl.
*B22F 1/00*       (2006.01)
*C22C 30/00*    (2006.01)
(Continued)

(52) U.S. Cl.
CPC ............ *B22F 1/0014* (2013.01); *B22D 23/00* (2013.01); *B22F 9/082* (2013.01); *B33Y 70/00* (2014.12);
(Continued)

(58) Field of Classification Search
CPC ...... B22F 1/0014; B22F 9/082; B22F 3/1055; B22F 2009/0824; B22F 2009/0848;
(Continued)

(56) References Cited

U.S. PATENT DOCUMENTS

2009/0074604 A1    3/2009  Chen et al.

FOREIGN PATENT DOCUMENTS

JP    2009-074173 A    4/2009

OTHER PUBLICATIONS

Zhu et al., "Early high-temperature behavior of Ti(C,N)-based cermets with multi-component AlCoCrFeNi high-entropy alloy binder," Int. Journal of Refractory Metals and Hard Materials, 44, 2014 35-41. Available online Jan. 23, 2014. (Year: 2014).*
(Continued)

*Primary Examiner* — Anthony J Zimmer
(74) *Attorney, Agent, or Firm* — Volpe and Koenig, P.C.

(57) ABSTRACT

An alloy structure which has high uniformity in the distribution of the element composition and the mechanical strength and excellent high-temperature strength and corrosion resistance, contains Fe and at least four elements, which are selected from the group consisting of elements from atomic number 13 to atomic number 79, included in Group 3 to Group 16 of the periodic table of the elements, and have a ratio of the atomic radius to an Fe atom of 0.83 or more but 1.17 or less, each of the elements in an atomic concentration range of 5 at % or more but 30 at % or less, a difference in atomic concentration among the at least four elements and Fe is in a range of less than 3 at %, and the
(Continued)

alloy structure has, as a main crystal, a column crystal in which the at least four elements and Fe are solid-dissolved.

15 Claims, 8 Drawing Sheets

(51) Int. Cl.
  *C22C 33/02* (2006.01)
  *C22C 1/04* (2006.01)
  *B33Y 70/00* (2020.01)
  *B22D 23/00* (2006.01)
  *B22F 9/08* (2006.01)
  *C22C 1/02* (2006.01)
  *C22C 1/06* (2006.01)
  *B22F 3/105* (2006.01)

(52) U.S. Cl.
  CPC ............. *C22C 1/02* (2013.01); *C22C 1/0433* (2013.01); *C22C 1/06* (2013.01); *C22C 30/00* (2013.01); *C22C 33/0285* (2013.01); *B22F 3/1055* (2013.01); *B22F 2009/0824* (2013.01); *B22F 2009/0848* (2013.01); *B22F 2998/10* (2013.01); *Y02P 10/295* (2015.11)

(58) Field of Classification Search
  CPC ..... B22F 2998/10; C22C 1/0433; C22C 1/06; C22C 1/02; C22C 33/0285; C22C 30/00; B33Y 70/00; B22D 23/00; Y02P 10/295
  See application file for complete search history.

(56) References Cited

OTHER PUBLICATIONS

Yue et al., "Microstructure of Laser Re-Melted AlCoCrCuFeNi High Entropy Alloy Coatings Produced by Plasma Spraying" Entropy 2013, 15, 2833-2845 (Published Jul. 19, 2013) (Year: 2013).*

Wang et al. "Cooling rate and size effect on the microstructure and mechanical properties of AlCoCrFeNi high-entropy alloy", Journal of Engineering Material Technology, 131(3), 034501-1(2009).

Kunce et al. "Structure and hydrogen storage properties of a high entropy ZrTiVCrFeNi alloy synthesized using Laser Engineered Net Shaoing (LENS), International Journal of Hydrogen Energy", Sep. 10, 2013, vol. 38, No. 27, p. 12180-12189.

Brif et al. The use of high-entropy alloys in additive manufacturing, Scripta Materialia, Apr. 1, 2015, Bol. 99, p. 93-96.

* cited by examiner (a)

(b)

(c)

ALLOY STRUCTURE AND METHOD FOR PRODUCING ALLOY STRUCTURE

TECHNICAL FIELD

The present invention relates to an alloy structure and a method for producing an alloy structure.

BACKGROUND ART

Alloy materials are used for various applications including structural members constituting skeletons of construct structures or instruments, various mechanism members, and the like, and in many cases, are also used for application in severe environments in which steel materials or aluminum materials are difficult to use. For example, nickel-based alloys, cobalt-based alloys, and the like have been developed which are applied to turbine members or the like provided in airplanes or power generators and are also applicable to hyperpyrexia environments of 1000° C. or higher. In addition, high alloy steel and the like have also been developed which can exhibit high corrosion resistance and high wear resistance even under such hyperpyrexia environments.

In recent years, as a type of alloy materials, multi-element alloys called high-entropy alloys (HEAs) have been drawn attention. The high-entropy alloys are generally regarded as alloys that are composed of approximately five or more elements and contain each element at an equiatomic ratio or an atomic ratio near the equiatomic ratio. The high-entropy alloys have characteristics in that the atomic diffusion rate is slow and are excellent in heat resistance, high-temperature strength, corrosion resistance, and the like. Thus, the high-entropy alloys are expected to be applied to uses in severe environments.

As a technique to which a high-entropy alloy is applied, for example, PTL 1 discloses a method for manufacturing an ultra-hard composite material, the method including a step of mixing at least one ceramic phase powder and a multi-element high-entropy alloy powder to form a mixture, a step of green compacting the mixture, and a step of sintering the mixture to form an ultra-hard composite material, in which the multi-element high-entropy alloy powder consists of 5 to 11 main elements, with each main element occupying 5 to 35 mol % of the multi-element high-entropy alloy powder.

Further, NPL 1 discloses that the size effects on the microstructure and mechanical properties of a high-entropy alloy containing Al, Co, Cr, Fe, and Ni at an equiatomic ratio are analyzed.

CITATION LIST

Patent Literature

PTL 1: JP 2009-074173 A

Non-Patent Literature

NPL 1: F. J. Wang, Y. Zhang, G. L. Chen, H. A. Davies, "Cooling rate and size effect on the microstructure and mechanical properties of AlCoCrFeNi high-entropy alloy", Journal of Engineering Material Technology, 131 (3), 034501-1 (2009)

SUMMARY OF INVENTION

Technical Problem

In order to apply a high-entropy alloy as a material for a structure such as a structural member or a mechanism member and produce a structure that makes the most of characteristics of the high-entropy alloy, it is desirable that a main component element constituting the high-entropy alloy is solid-dissolved at an equiatomic ratio and a solid solution phase is formed such that uniformity of the element composition distribution is increased on the entire region of the structure with a variety of shape dimensions.

However, in the method for producing a high-entropy alloy of the related art exemplified by the mechanical alloying method disclosed in PTL 1, the arc melting method disclosed in NPL 1, or the like, unevenness easily occurs in the element composition distribution, the melting rate, the cooling rate, or the like, a solidification structure having uniform element composition distribution cannot be formed, and the size of a solid solution phase obtained by solid-dissolving respective elements substantially at an equiatomic ratio is difficult to increase. For example, the alloy material disclosed in NPL 1 is merely a small piece having a size of 10 mm (diameter)×70 mm (height) (volume: 5495 mm$^3$) even in the case of the maximum trial material and is difficult to apply as a material of the structure.

In particular, when a relatively large structure is intended to be casted, it is necessary to provide a step of melting a large amount of a base metal or solidifying molten metal. Thus, problems arise in that an influence of unevenness in the element composition distribution, the melting rate, the cooling rate, or the like becomes strongly apparent so that the solid solution phase of the high-entropy alloy is difficult to form. Moreover, the high-entropy alloy has excellent high-temperature strength and corrosion resistance, but has a feature that the atomic diffusion rate is slow. Thus, depending on a heat treatment after solidification, it is difficult to secure the uniformity of the element composition or the mechanical strength. Furthermore, since the high-entropy alloy is a difficult-processing material, a structure having an arbitrary shape is also difficult to obtain by cutting the high-entropy alloy after solidification, and thus under the present circumstances, it is difficult to obtain a high-entropy alloy structure having high uniformity in the distribution of the element composition and the mechanical strength.

In this regard, an object of the present invention is to provide an alloy structure with an arbitrary shape dimension which has high uniformity in the distribution of the element composition and the mechanical strength and excellent high-temperature strength and corrosion resistance.

Solution to Problem

The present invention employs, for example, configurations described in claims in order to solve the above-described problems.

Advantageous Effects of Invention

According to the present invention, it is possible to provide an alloy structure with an arbitrary shape dimension which has high uniformity in the distribution of the element composition and the mechanical strength and excellent high-temperature strength and corrosion resistance.

BRIEF DESCRIPTION OF DRAWINGS

2(a) is a cross-sectional view of the alloy structure according to this embodiment, FIG. 2(b) is an enlarged cross-sectional view of A portion in FIG. 2(a), and FIG. 2(c) is a cross-sectional view illustrating the outline of a metallic structure of an alloy material related to Comparative Example.

DESCRIPTION OF EMBODIMENTS

Figure 1:
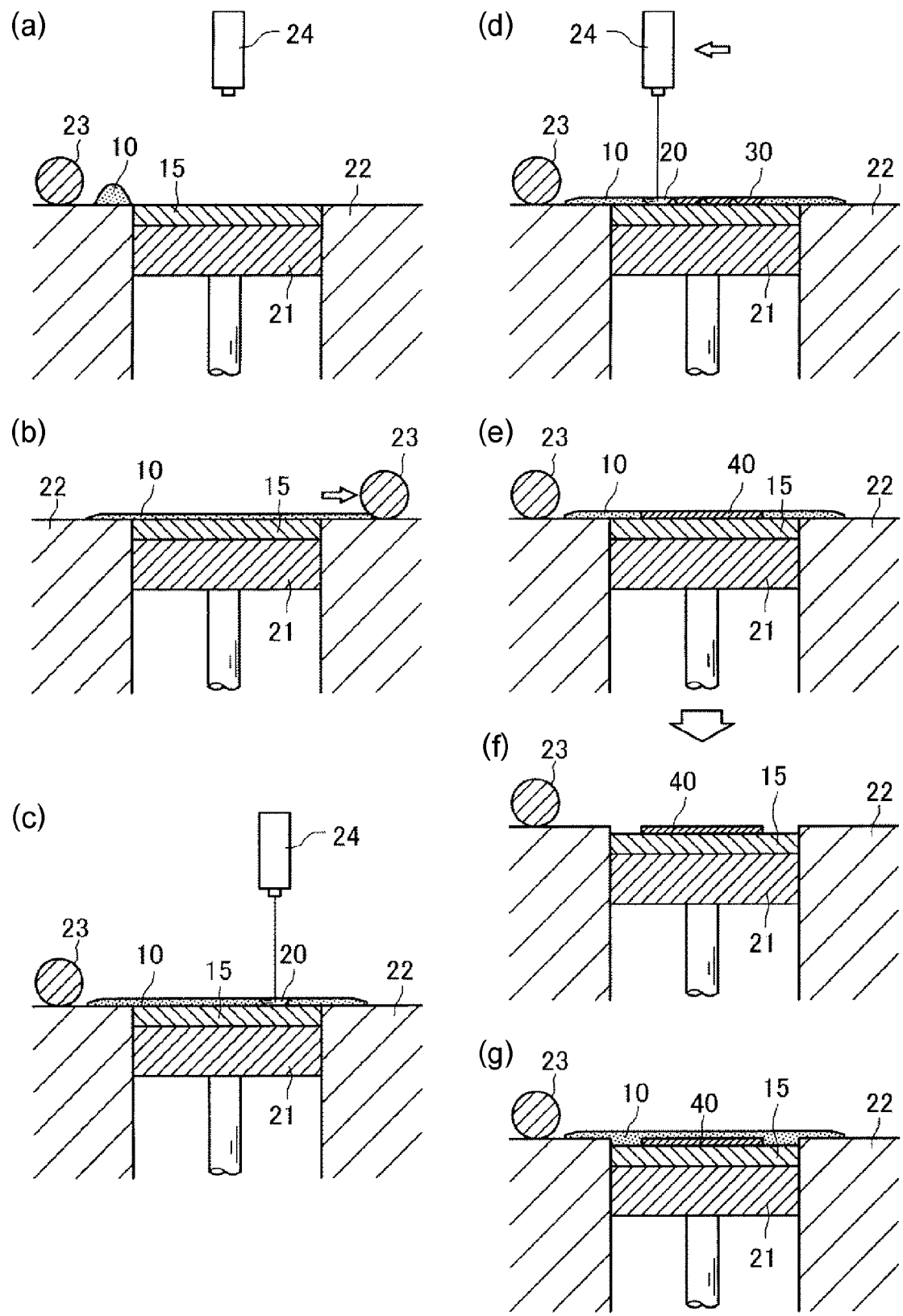
FIGS. 1(a) to 1(g) are conceptual diagrams illustrating an example of processes of a method for producing an alloy material according to this embodiment.

Hereinafter, an alloy structure according to an embodiment of the present invention will be described. Incidentally, the same symbols are given to the common configurations in each drawing and the duplicated description is omitted.

The alloy structure according to this embodiment is formed by a high-entropy alloy containing iron (Fe) and at least four or more elements other than Fe which is solid-dissolved with Fe (hereinafter, referred to as non-Fe main component elements in some cases) as main components, and is a metallic manufactured object which is manufactured in a desired shape dimension by additive manufacturing. This alloy structure contains each element of the non-Fe main component elements and the Fe element at an atomic concentration range of 5 at % or more but 30 at % or less, and has an element composition in which at least four elements among these elements are contained at a substantially equiatomic ratio. Further, the non-Fe main component elements and the Fe element form a solid solution phase in which these plural types of elements are multi-dimensionally solid-dissolved. For such reasons, this alloy structure has high heat resistance, high-temperature strength, wear resistance, and corrosion resistance as general properties of a high-entropy alloy. In addition, as described below, this alloy structure has a unique solidification structure formed by additive manufacturing, and has a feature that the uniformity in the distribution of the element composition and the mechanical strength is high.

The alloy structure according to this embodiment has a main crystal substantially formed by an aggregate of column crystals under normal temperature and normal pressure. The proportion of the column crystals is at least 50% or more in terms of an occupying area rate in an arbitrary cross-section of the solidification structure, and can be adjusted to 90% or more or 95% or more depending on the formation conditions of the solidification structure in a production method to be described later. In addition, the average grain size of the column crystal is 100 µm or less, and can also be adjusted to become finer up to 10 µm or less. Incidentally, the average grain size can be obtained according to the method defined in JIS G 0551 (2013).

The main crystal of the alloy material structure has a crystalline structure of a face-centered cubic lattice or a body-centered cubic lattice under normal temperature and normal pressure. When the composition is selected and designed, the proportion of the crystalline structure of the face-centered cubic lattice can be adjusted to 90% or more or 95% or more in terms of an occupying area rate in an arbitrary cross-section of the solidification structure. Further, the proportion of the crystalline structure of the body-centered cubic lattice can also be adjusted to 90% or more or 95% or more in terms of an occupying area rate in an arbitrary cross-section of the solidification structure.

As the non-Fe main component elements, at least four or more elements are selected from elements other than Fe from atomic number 13 to atomic number 79 included in Group 3 to Group 16 (Group 3A to Group 6B) of the periodic table of the elements, which have a ratio of the atomic radius to an Fe atom of 0.83 or more but 1.17 or less. Specific examples of such non-Fe main component elements include Al, Si, P, Ti, V, Cr, Mn, Co, Ni, Cu, Zn, Ga, Ge, As, Se, Nb, Mo, Tc, Ru, Rh, Pd, Ag, Sn, Sb, Te, Ta, W, Re, Os, Ir, Pt, and Au. When the alloy structure has such an element composition, a stable solid solution phase exhibiting the atomic volume effect and an action as a high-entropy alloy can be formed.

As the non-Fe main component elements, it is more preferable to include an element having a ratio of the atomic radius to the Fe atom of 0.92 or more but 1.08 or less, and it is still more preferable to include only such an element together with Fe. Specific examples of a non-Fe main component element serving as a main component element together with Fe include Si, V, Cr, Mn, Co, Ni, Cu, Zn, Ga, Ge, As, Se, Mo, Tc, Ru, Rh, Re, Os, and Ir. Among these, a non-Fe main component element is more preferably V, Cr, Mn, Co, Ni, Cu, Ge, and Mo, and particularly preferably includes Co, Cr, and Ni.

Specific examples of the element composition of the alloy structure may include CoCrFeNiAl, CoCrFeNiCu, CoCrFeNiCuAl, CoCrFeNiCuAlSi, MnCrFeNiCuAl, CoCrFeNiMnGe, CoCrFeNiMn, CoCrFeNiMnCu, TiCoCrFeNiCuAlV, TiCoCrFeNiAl, AlTiCoCrFeNiCuVMn, TiCrFeNiCuAl, TiCoCrFeNiCuAl, CoCrFeNiCuAlV, TiCoCrFeNiAl, TiCoCrFeNiCuAl, CoCrFeNiCuAl, CoFeNiCuV, CoCrFeNiCuAl, MnCrFeNiAl, MoCrFeNiCu, TiCoCrFeNi, TiCoCrFeNiMo, CoCrFeNiCuAlV, MnCrFeNiCu, TiCoCrFeNi, TiCoCrFeNiAl, CoCrFeNiMo, CoCrFeNiAlMo, TiCoCrFeNiCu, CoCrFeNiCuAlMn, TiCoCrFeNiMo, CoCrFeNiCuAlV, TiCoCrFeNiCuVMn, AlTiCoCrFeNiCuVMn, CoCrFeNiCuAlMn, CoCrFeNiAlMo, CoCrFeNiCuAlMo, TiCoCrFeNiCu. Incidentally, in these element compositions, as the atomic concentration of each element (molar ratio of atom), various values can be employed as long as the atomic concentration of the range of 5 at % or more but 30 at % or less and the element composition in which at least four elements have a substantially equiatomic ratio are satisfied. However, when Ti is contained as a component element, Ti is set not to be a component having maximum atomic concentration in the component element, and preferably, the atomic concentration for each alloy structure is set to be 5 at % or more but less than 10 at %.

The alloy structure is allowed to contain elements of other inevitable impurities in addition to the non-Fe main component elements and Fe. Examples of the elements of inevitable impurities include P, Si, S, Sn, Sb, As, Mn, O, and N. However, the concentration of P is limited to preferably 0.005 wt % or less and more preferably 0.002 wt % or less, the concentration of Si is limited to preferably 0.040 wt % or less and more preferably 0.010 wt % or less, the concentration of S is limited to preferably 0.002 wt % or less and more preferably 0.001 wt % or less, the concentration of Sn is limited to preferably 0.005 wt % or less and more preferably 0.002 wt % or less, the concentration of Sb is limited to preferably 0.002 wt % or less and more preferably 0.001 wt % or less, the concentration of As is limited to preferably 0.005 wt % or less and more preferably 0.001 wt % or less, and the concentration of Mn is limited to preferably 0.050 wt % or less and more preferably 0.020 wt % or less. Further, the concentration of O is limited to preferably 0.001 wt % or less (10 ppm or less) and more preferably 0.0003 wt % or less (3 ppm or less), and the concentration of N is limited to preferably 0.002 wt % or less (20 ppm or less) and more preferably 0.001 wt % or less (10 ppm or less). When the concentration of inevitable impurities included in the alloy structure is limited in this way, the uniformity in the distribution of the element composition and the mechanical strength can be further increased regardless of the shape dimension of the structure. Incidentally, when an element of P, Si, Sn, Sb, As, or Mn is contained as a non-Fe main component element in the alloy structure, it is not necessary to limit the concentration of the element in this way.

The alloy structure contains at least four elements of the non-Fe main component elements and Fe in an atomic concentration range of 5 at % or more but 23.75 at % or less at a substantially equiatomic ratio. At this time, other elements are contained in an atomic concentration range of 5 at % or more but 30 at % or less and the balance is composed of inevitable impurities. When at least four elements are contained at an equiatomic ratio in this way, the mixing entropy term of free energy is increased, and thus the solid solution phase is stabilized. Incidentally, in the present specification, the term "substantially equiatomic ratio" means that a difference in atomic concentration is in a range of less than 3 at %.

Regarding the type and the atomic ratio of elements constituting the alloy structure, the composition can be selected and designed, for example, by obtaining generated enthalpy, entropy, or Gibbs energy with thermodynamic calculation. For example, the atomic concentration ratio of each of at least four elements and other element contained at an equiatomic ratio can be appropriately changed in the above atomic concentration range. When the atomic concentration ratio of each of these main component elements is changed, the crystalline structure of the alloy structure can be changed and mechanical strength, malleability, hardness, density, or the like can be adjusted. As the thermodynamic calculation, it is possible to appropriately combine first principle calculation, a Calphad (Calculation of phase diagrams) method, a molecular dynamics method, a Phase-Field method, a finite element method, and the like and use the combination thereof.

The alloy structure can have, for example, an element composition in which Al is contained in an atomic concentration range of 5 at % or more but 30 at % or less and Co, Cr, Fe, and Ni are contained in an atomic concentration range of 15 at % or more but 23.75 at % or less at a substantially equiatomic ratio. When the atomic concentration of Al contained in the alloy structure is decreased to a range of 5 at % or more but 30 at % or less, the main phase of the alloy structure can be configured to have a crystalline structure of a face-centered cubic lattice. On the other hand, when the atomic concentration of Al is increased to a range of 5 at % or more but 30 at % or less, the main phase of the alloy structure can be configured to have a crystalline structure of a body-centered cubic lattice. In addition, when the atomic concentration of Al contained in the alloy structure is 5 at % or more, there is little concern of excessively decreasing the mechanical strength of the alloy structure. On the other hand, when the atomic concentration of Al contained in the alloy structure is 30 at % or less, the main phase of the alloy structure is less likely to be an Al-based intermetallic compound, and thus there is little concern of excessively decreasing the ductibility of the alloy material.

Similarly, Co may be contained in an atomic concentration range of 5 at % or more but 30 at % or less and Al, Cr, Fe, and Ni may be contained in an atomic concentration range of 15 at % or more but 23.75 at % or less at a substantially equiatomic ratio; Cr may be contained in an atomic concentration range of 5 at % or more but 30 at % or less and Al, Co, Fe, and Ni may be contained in an atomic concentration range of 15 at % or more but 23.75 at % or less at a substantially equiatomic ratio; Fe may be contained in an atomic concentration range of 5 at % or more but 30 at % or less and Al, Co, Cr, and Ni may be contained in an atomic concentration range of 15 at % or more but 23.75 at % or less at a substantially equiatomic ratio; or Ni may be contained in an atomic concentration range of 5 at % or more but 30 at % or less and Al, Co, Cr, and Fe may be contained in an atomic concentration range of 15 at % or more but 23.75 at % or less at a substantially equiatomic ratio.

Next, the method for producing an alloy structure according to this embodiment will be described.

The alloy structure according to this embodiment can be produced by powder additive manufacturing using an alloy powder. This production method is a method for producing an alloy structure as a three-dimensionally manufactured object having a desired shape dimension by melting and then solidifying the alloy powder to form a solidification structure and arranging a large number of solidification structures while integrating the solidification structures with the surroundings. The method for producing an alloy structure according to this embodiment includes a powder preparation step of preparing an alloy powder to be used in additive manufacturing and an additive manufacturing step of manufacturing an alloy structure by using the prepared alloy powder.

In the powder preparation step, an alloy powder, which contains the same main component element and addition element as those of an alloy structure to be produced and has an element composition in which the main component element becomes a substantially equiatomic ratio, is prepared. The alloy powder is preferably a particulate aggregate in which each powder particle has substantially the same element composition as that of the alloy structure to be produced. Incidentally, since a part of the alloy component may be volatized and lost when the alloy powder is heated in the solidified layer manufacturing step in some cases, the atomic concentration range may be set to high in consideration of the composition change caused by such volatilization.

As the method for preparing the alloy powder, a method for producing a metal powder which is generally used in the related art can be used. For example, it is possible to use an appropriate method such as an atomizing method in which a fluid is blown to the molten metal of the alloy to scatter and solidify the molten metal, a pulverizing method in which the molten metal of the alloy is solidified and then mechanically pulverized, a mechanical alloying method in which a metal powder is mixed and then pressure welding and pulverizing are repeated on the mixed metal powder to obtain an alloy, or a melt spinning method in which the molten metal of the alloy is caused to flow down onto a rotating roll so as to be solidified.

As the method for preparing the alloy powder, an atomizing method is preferably used, a gas atomizing method is more preferably used, and a gas atomizing method which is performed by using an inert gas as the fluid under inert gas atmosphere. According to the preparation method, it is possible to prepare an alloy powder with high sphericity and little incorporation of impurities. Further, when the sphericity of the alloy powder is increased, resistance at the time of extending the alloy powder in the additive manufacturing is suppressed, and thus unevenness in the alloy powder can be decreased. Furthermore, by using the inert gas, the incorporation of oxide impurities or the like is suppressed, and thus the metallic structure of an alloy material to be produced can be more uniform.

The particle size of the alloy powder can be appropriately adjusted depending on a method of extending the alloy powder in the additive manufacturing or melting conditions such as the output of a heat source by which the alloy powder is melted. However, generally, the particle size distribution of the alloy powder is preferably in a range of 1 μm or more but 500 μm or less. The reason for this is that, when the particle size of the alloy powder is 1 μm or more, splashing or floating of the alloy powder is suppressed or oxidation reactivity of the metal is suppressed so that there is little concern of dust explosion or the like. On the other hand, when the particle size of the alloy powder is 500 μm or less, there is an advantage in that the surface of the solidified layer to be formed in the additive manufacturing is likely to become flat and smooth. Further, since the output of the heating means for melting the alloy powder can be suppressed so that the melting rate of the alloy powder and the range of the heated region at the time of local heating of the alloy powder are easily controlled, the manufacturing accuracy of the alloy structure and the uniformity of the solidification structure can be easily secured.

FIGS. 1(a) to 1(g) are conceptual diagrams illustrating an example of processes of a method for producing an alloy structure according to this embodiment.

In the method for producing an alloy structure according to this embodiment, the alloy structure is three-dimensionally manufactured by repeating the additive manufacturing step illustrated in FIGS. 1(a) to 1(g) in this order. The additive manufacturing step can be performed by using a powder additive manufacturing apparatus for a metal which has been generally used in the related art, and the alloy powder prepared in the powder preparation step is used as a raw material powder for such an additive manufacturing step. As a heating means provided in the additive manufacturing apparatus, for example, a heating means using a suitable heating principle such as electron beam heating, laser heating, microwave heating, plasma heating, light-concentrating heating, or high-frequency heating is used. Among these, an additive manufacturing apparatus using electron beam heating or laser heating is particularly preferable. The reason for this is that, according to electron beam heating or laser heating, the output of a heat source, miniaturization of the heated region of the alloy powder, the manufacturing accuracy of the alloy structure, and the like can be relatively easily controlled.

Specifically, the additive manufacturing step includes a powder extending step and a solidified layer manufacturing step. In the additive manufacturing step, a layer-shaped solidification structure (solidified layer) is formed through processes as illustrated in FIGS. 1(a) to 1(g) in this order, and an alloy structure formed by an aggregate of solidification structures is manufactured by repeating the formation of the layer-shaped solidification structure (solidified layer).

As illustrated in FIG. 1(a), an additive manufacturing apparatus is provided with a vertically movable piston having a substrate mounting table 21 at the upper end thereof. A processing table 22 which is not interlocked with the piston is provided around this substrate mounting table 21, and a powder feeder (not illustrated) supplying a raw material powder 10 onto the processing table 22, a recoater 23 extending the supplied raw material powder 10, a heating means 24 for heating the raw material powder 10, an air blast (not illustrated) removing the raw material powder 10 on the processing table 22, a temperature controller (not illustrated), and the like are provided. The processing table 22 and these instruments are accommodated in a chamber, the atmosphere in the chamber is set to vacuum atmosphere or inert gas atmosphere such as argon gas depending on the types of the heating means 24, and the atmosphere pressure and temperature are configured to be managed. When the additive manufacturing is performed, a substrate 15 is mounted on the substrate mounting table 21 in advance, and a surface to be manufactured (upper surface) of the substrate 15 and the upper surface of the processing table 22 are positioned to be flush with each other.

Appropriate materials can be used as the substrate 15 as long as they have heat resistance with respect to heating by the heating means 24. In this method for producing an alloy structure, by performing the additive manufacturing of the alloy structure on the surface to be manufactured of the substrate 15, it is possible to obtain a manufactured object in a state where the substrate 15 and the alloy structure are integrated to each other. For this reason, the substrate 15 having an appropriate shape such as a flat plate shape can be used as the substrate 15 on the assumption that the substrate 15 is separated from the alloy structure by cut processing. Alternatively, on the assumption that the substrate 15 and the alloy structure are operated in a state where they are integrated to each other, an arbitrary shaped structural member, mechanism member, or the like having a surface to be manufactured can be used as the substrate 15.

In the powder extending step, the prepared alloy powder 10 is extended on the surface to be manufactured. That is, in the first powder extending step in the additive manufacturing, the alloy powder 10 is extended on the substrate 15 mounted on the additive manufacturing apparatus. The extending of the alloy powder 10 can be performed in such a manner that as illustrated in FIG. 1(b), the alloy powder 10 supplied onto the processing table 22 by the powder feeder (not illustrated) (see FIG. 1(a)) is swept such that the recoater 23 passes above the surface to be manufactured (substrate 15) to pave the alloy powder 10 in a thin layer shape. The thickness of the thin layer, which is formed by extending the alloy powder, of the alloy powder 10 can be appropriately adjusted depending on the output of the heating means for melting the alloy powder 10, the average particle size of the alloy powder 10, or the like, but is preferably in a range of about 10 μm or more but 1000 μm or less.

In the solidified layer manufacturing step, the extended alloy powder 10 is locally heated to be melted and then solidified, and the heated region caused by local heating is scanned to the flat surface on which the alloy powder 10 is extended, thereby manufacturing a solidified layer 40. The manufacturing of the solidified layer 40 (see FIG. 1(e)) is performed by scanning the heated region caused by the heating means 24 according to two-dimensional shape information obtained from three-dimensional shape information (3D-CAD data or the like) representing the three-dimensional shape of an alloy structure to be produced. The two-dimensional shape information is information specifying the shape of each thin layer in a case where the three-dimensional shape of an alloy structure to be produced is hypothetically sliced with a predetermined thickness interval to be divided into an aggregate of plural thin layers. The solidified layer 40 having a predetermined two-dimensional shape and a predetermined thickness is formed according to such two-dimensional shape information.

The local heating of the alloy powder 10 is performed, as illustrated in FIG. 1(c), by the heating means 24 while the heated region on the extended alloy powder 10 is limited, and is performed by selectively melting a portion of the extended alloy powder 10 to form a minute molten pool (melted portion 20). The size of the melted portion 20 formed by melting the alloy powder 10 is preferably set to a diameter of 1 mm or less. When the melted portion 20 is limited to such a minute size, the manufacturing accuracy of the alloy structure and the uniformity of the element composition in the solidification structure are improved.

The heated region caused by local heating of the alloy powder 10 is scanned, as illustrated in FIG. 1(d), to move in parallel to the surface to be manufactured. The scanning of the heated region may be performed by scanning of an irradiation spot of a heat source by a galvanometer mirror or the like as well as the scanning of the main body of the heating means 24, or may be performed by an appropriate method such as raster scanning. At this time, overlapping scanning by a plurality of radiation sources may be performed to flatten the density of energy to be radiated. Then, local heating is newly performed, by the scanning of the heated region, on a region in which the alloy powder 10 is not melted yet, heating of the region in which the alloy powder 10 has been already melted to form the melted portion 20 is stopped, and the melted portion 20 is cooled under atmospheric temperature to be solidified. A solidified portion 30 formed by solidifying the melted portion 20 forms a dense aggregate of the solidified portions 30 while being integrated with a substrate or the solidified portion 30 which has been already formed.

The scanning rate, output, energy density, and scanning width of the heating means 24 may be appropriately adjusted based on the element composition and the grain size distribution of the alloy powder 10, the material of the substrate 15, the positional relationship between the melted portion 20 and the solidified portion 30, and the heat transfer or heat radiation estimated from the chamber temperature or the like. Further, the cooling temperature at which the melted portion 20 is cooled may be set depending on the element composition of the alloy structure in consideration of dimension variation, thermal strain, or the like. When scanning is performed while the size of the melted portion 20, the melting rate, the cooling rate, the time intervals for melting and cooling, and the like are maintained to a predetermined range, it is possible to make the strength distribution of the alloy structure to be manufactured uniform or to decrease residual stress or surface roughness.

As illustrated in FIGS. 1(c) to 1(e), an aggregate of the solidified portions 30 is formed on the substrate 15 mounted on the substrate mounting table 21 by repeating the melting and solidifying the alloy powder 10 to thereby form a solidified layer 40 having a predetermined two-dimensional shape and a predetermined thickness. After unmelted alloy powder 10 remaining around and on the formed solidified layer 40 is removed by the air blast, as illustrated in FIG. 1(f), the substrate mounting table 21 is descended to the height corresponding to the thickness of the formed solidified layer 40 so that a new surface to be manufactured on the upper surface of the solidified layer 40 and the upper surface of the processing table 22 are positioned to be flush with each other.

After the positioning, the powder extending step is performed in the same manner as in FIGS. 1(a) and 1(b), and as illustrated in FIG. 1(g), the alloy powder 10 newly supplied is extended on the upper surface of the solidified layer 40, which has been already formed. Thereafter, the solidified layer manufacturing step is performed in the same manner as in FIGS. 1(c) to 1(e), and then lamination of a subsequent layer of the solidified layer 40 is performed. The solidified portion 30 to be laminated is integrated with a portion of the solidified layer 40 of the lower layer and then densely sintered. Subsequently, similarly, the powder extending step and the solidified layer manufacturing step are repeated while the upper surface of the formed solidified layer 40 is used as the surface to be manufactured, so that an alloy structure having a desired shape dimension can be subjected to additive manufacturing.

In the solidified layer manufacturing step, in a high-temperature state until the solidified portion 30 is formed after the alloy powder 10 is melted, shape-molding processing or surface processing of the solidified portion 30 or the solidified layer 40 can be performed. Such processing can be performed by carrying out processing, for example, with a metal or alloy tool, or an inorganic or inorganic composite tool formed by a green pellet such as a diamond powder, an intermetallic compound powder, or tungsten carbide in a state where the surface temperature of the melted portion 30 or the solidified portion 40 is about 500° C. or higher, preferably, in a temperature range of 50% to 75% of the melting point (Tm) of the alloy. By performing such processing, an alloy structure which is difficult to process can be molded in higher precision shape dimension or can be decorated.

Hot isostatic pressing (HIP) may be separately performed on the alloy structure subjected to additive manufacturing by repeating the powder extending step and the solidified layer manufacturing step. The reason for this is that, when the alloy structure is subjected to hot isostatic pressing, the solidification structure of the alloy structure can be made denser or defects of the solidification structure can be removed in some cases.

According to the method for producing an alloy structure in which three-dimensionally manufacturing is performed by repeating such an additive manufacturing step, an alloy structure having a column crystal as a main crystal can be produced in a desired shape dimension by an aggregate of minute solidification structures. Further, since the element composition of each of minute solidification structures (solidified portions 30) suitably reflects the element composition of the used alloy powder, a solid solution phase with high uniformity of the element composition distribution and high uniformity of the mechanical strength distribution can be formed. Moreover, since the solidification structures (solidified portions 30) can be formed by performing heating from one direction and the solidification structures (solidified layers 40) in which the crystal growth direction is oriented in almost one direction can be laminated, an alloy structure with high anisotropy can be formed.

Next, the metallic structure of the alloy structure formed by additive manufacturing will be described.

Figure 2:
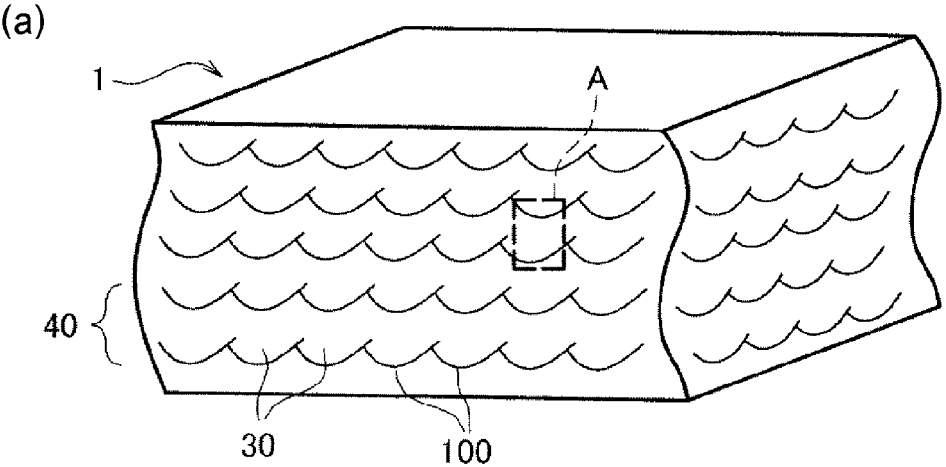
FIGS. 2(a) to 2(c) are cross-sectional views illustrating the outline of a metallic structure of an alloy structure. FIG.
Figure 2:
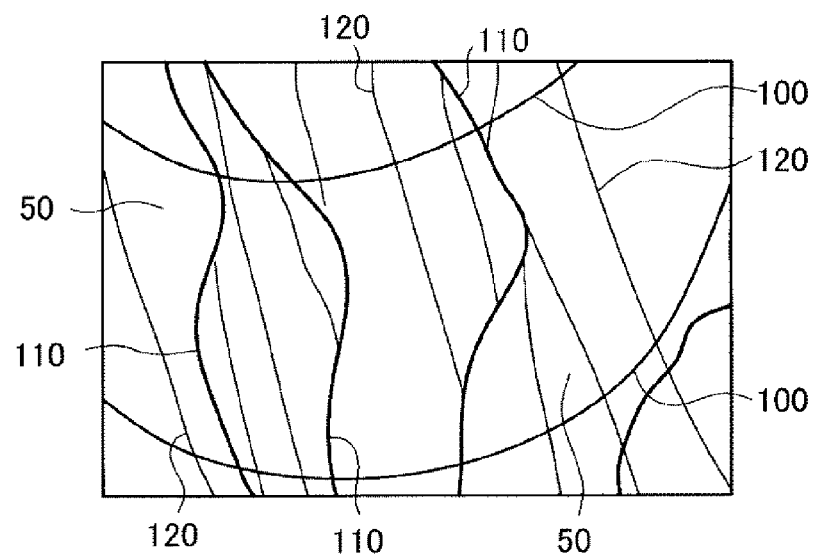
Figure 2:
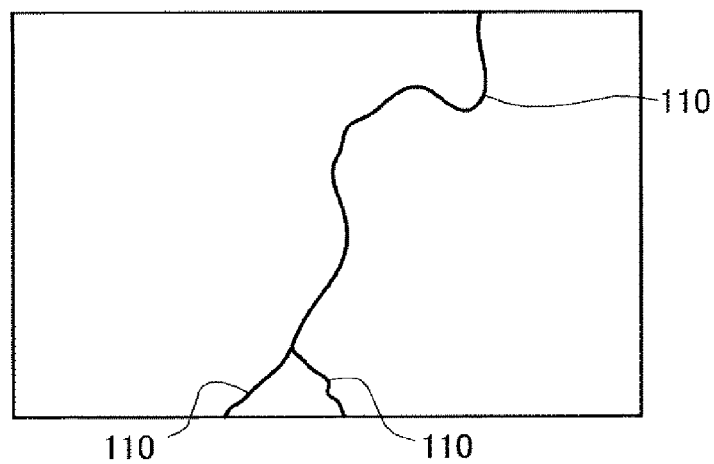

FIGS. 2(a) to 2(c) are cross-sectional views illustrating the outline of a metallic structure of an alloy structure. FIG.

2(a) is a cross-sectional view of the alloy structure according to this embodiment, FIG. 2(b) is an enlarged cross-sectional view of A portion in FIG. 2(a), and FIG. 2(c) is a cross-sectional view illustrating the outline of a metallic structure of an alloy material related to Comparative Example.

As illustrated in FIG. 2(a), an alloy structure 1 according to this embodiment is formed by an aggregate of the solidification structures (solidified portions 30) which is formed by solidifying a melted alloy having a metallic structure derived from the production method using the above-described additive manufacturing. Incidentally, in FIG. 2(a), a cross-section obtained by extracting a portion of the alloy structure produced by additive manufacturing is illustrated. Each solidification structure (solidified portion 30) has an original form with a substantially semispherical shape derived from a contour shape of a molten pool (melted portion 20) caused by local heating and is integrated with another solidified portion 30 existing at a periphery of the solidified portion 30 so as to form a dense metallic structure. In addition, respective solidified portions 30 are two-dimensionally arranged while the arc sides thereof face the same direction, and thus the layer-shaped solidified layer 40 formed by an aggregate of the solidified portions 30 is formed. Then, a plurality of the solidified layers 40 formed in this way are laminated so as to form a metallic structure in which the solidified portions 30 are three-dimensionally arranged. However, since the solidified portions 30 forming the solidified layer 40 may be integrated with other solidified portions 30 at a periphery of the solidified portions 30 in the same layer or the string side of each solidified portion 30 may be integrated with another laminated solidified layer 40 in some case depending on manufacturing conditions such as the scanning rate and the scanning width in the additive manufacturing, the original form with a substantially semispherical shape of the solidified portion and a melting boundary 100 between the solidified portions 30 may not be observed in the solidification structure in some cases.

The alloy structure 1 has, as illustrated in FIG. 2(b), a column crystal in which non-Fe main component elements and Fe is solid-dissolved, as a main crystal. Incidentally, in FIG. 2(b), the cross-section of the metallic structure of the alloy structure is enlarged at a viewing angle of several hundred micrometers to several millimeters and then illustrated. Each crystal grain 50 included in the metallic structure of the alloy structure is epitaxially grown such that the crystal orientation is substantially along the laminating direction of the solidified layer 40, and the structure extending beyond the melting boundary 100 between the solidified portions 30 is created while a grain boundary 110 (high-angle grain boundary) is oriented toward the laminating direction.

Further, each crystal grain 50 may be miniaturized to have an average grain size of 10 µm or less. The miniaturized crystal grains 50 maintain the crystal orientation, and a low-angle grain boundary 120 may be recognized at the inner side comparted in the high-angle grain boundary 110. Incidentally, the low-angle grain boundary 120 is defined as a grain boundary with a tilt angle of 15° or lower, and the high-angle grain boundary 110 is defined as a grain boundary with a tilt angle of higher than 15°. The miniaturized crystal grains 50 tend to be an aggregate of crystal grains with a small tilt angle and a small torsion angle.

On the other hand, a high-entropy alloy material of the related art (alloy material related to Comparative Example) has a metallic structure derived from the production method using casting. In the alloy material related to Comparative Example, as illustrated in FIG. 2(c), the grain boundary 110 isotropically extending is recognized and a coarse crystal grain of an equiaxial crystal having an average grain size of more than 100 µm tends to be formed. Incidentally, in FIG. 2(c), the cross-section of the metallic structure of the alloy material is enlarged at a viewing angle of several hundred micrometers to several millimeters and then illustrated. In the alloy material related to Comparative Example, segregation is easily generated according to nucleus growth, the uniformity of the composition distribution is low, stress is difficult to disperse since the crystal grain is coarse, and the surface in which cleavage or slip occurs is elongated. Thus, the mechanical strength is not sufficient. In particular, since the solid solution phase cannot be appropriately grown, there are problems in that dimension is small and complicated shapes cannot be formed.

On the other hand, regarding the alloy structure according to this embodiment, crystals with relatively aligned crystal orientation are epitaxially grown so as to be an aggregate of the crystal grains 50 which are appropriately grown under the similar environment. Thus, the element composition adjusted with respect to the alloy powder is easily maintained without depending on the shape dimension of the alloy structure and the uniformity of the composition distribution is increased. Further, there are advantages in that the crystal grains 50 are miniaturized, strain caused by stress is difficult to locally concentrate, and the uniformity of the mechanical strength is increased. In addition, since the surface in which cleavage or slip occurs is shortened, there is an advantage in that the mechanical strength is improved. Moreover, since the growth direction of crystals is oriented and anisotropy is increased, there is also an effective advantage when directional strength or magnetic characteristics are used.

Next, an example of the method for producing an alloy powder used as a raw material of the alloy structure according to this embodiment will be described.

FIGS. 3(a) to 3(i) are schematic flowcharts illustrating an example of a method for producing an alloy powder used as a raw material of the alloy structure.

As described above, various properties of the alloy structure according to this embodiment are likely to be reflected by the influence of the element composition of the alloy powder to be used in additive manufacturing. Therefore, the alloy powder to be used as a raw material preferably has the element composition in which the concentration of inevitable impurities is decreased, and as a preferred embodiment of the method for producing an alloy powder, it is preferable to use a production method using multiple refining which uses a vacuum carbon deoxidation method by which an alloy with high cleanliness can be produced. The method for producing an alloy powder illustrated in FIGS. 3(a) to 3(i) is to perform ladle refining using a ladle, refine an alloy with high cleanliness by performing multiple refinement, which uses a vacuum carbon deoxidation method, using a crude metal as a base metal of a raw material, and then preparing an alloy powder by using this alloy. This method for producing an alloy powder can be applied as the preparation step of the alloy powder.

Figure 3:
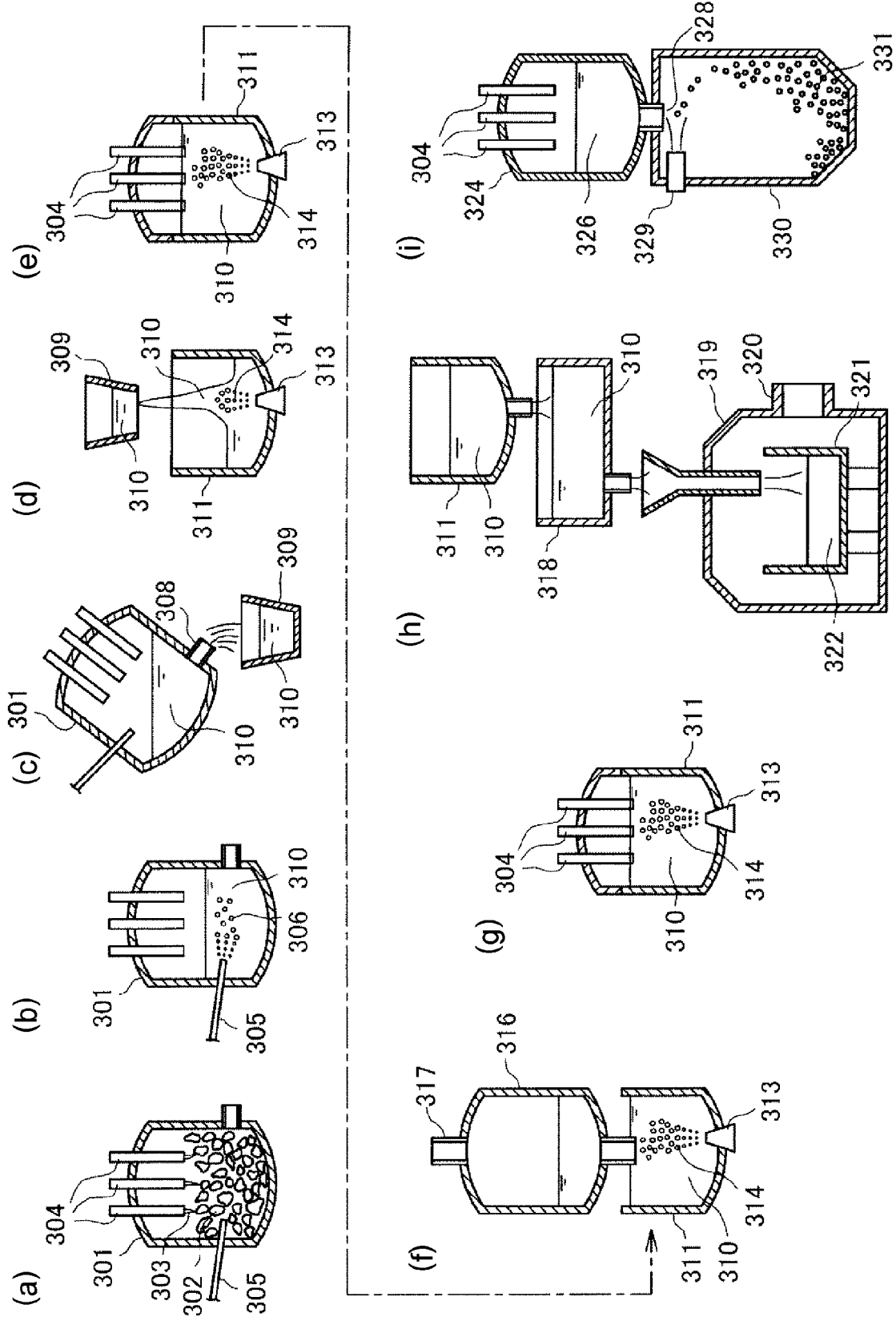
FIGS. 3(a) to 3(i) are schematic flowcharts illustrating an example of a method for producing an alloy powder used as a raw material of the alloy structure.

In this production method, as illustrated in FIG. 3(a), first, a melting treatment of melting metal ingots 302 of crude metal serving as a raw material of an alloy powder is performed by an electric furnace 301. Incidentally, in FIG. 3(a), the electric furnace 301 is regarded as a three-phase AC arc furnace which is provided with electrodes 304, such as a carbon electrode, generating arc discharge in the furnace and an oxygen burner 305 blowing oxygen gas into the furnace, but a DC arc furnace or converter furnace having the same configuration as described above can also be used.

Metal scraps, iron scraps, or the like can be used as the metal ingots. Regarding the types of the metal ingots 302, it is preferable to select the type of a metal ingot which is blended to have an element composition suitable for an alloy powder to be produced and has a small amount of impurity elements in advance. It is preferable to select the type of a metal ingot in which Sn is contained in a range of 0.005 wt % or less, Sb is contained in a range of 0.002 wt % or less, and As is contained in a range of 0.005 wt % or less when the these elements are not contained as the non-Fe main component elements.

In the melting treatment, as illustrated in FIG. 3(a), the metal ingots 302 are put into the electric furnace 301, and arc discharge 303 is generated between the electrodes 304 and the metal ingots 302 to melt the metal ingots 302, thereby obtaining molten metal 310. Then, as illustrated in FIG. 3(b), a peroxidation treatment of forming a slag is performed by blowing oxygen gas 306 to the molten metal 310 by the oxygen burner 305. When the peroxidation treatment of blowing oxygen to the molten metal 310 is performed in this way, impurity elements such as Si, Mn, and P included in the molten metal 310 are converted to oxides so that the oxides can be transferred to the slag. Further, there is also an advantage in that the amount of electrical power for heating the molten metal 310 by combustion heat generated by oxygen can be reduced.

After the slag is formed in the molten metal 310, as illustrated in FIG. 3(c), the molten metal 310 is tapped from a tap hole 308 of the electric furnace 301 and transferred to a ladle 309. At this time, the molten metal 310 and the slag, which contains a large amount of impurity elements floating on the liquid surface of the molten metal 310, are separated from each other so that the slag is not transferred to the ladle 309, thereby obtaining the molten metal 310 in which the concentration of each of impurity elements such as Si, Mn, and P is decreased.

Subsequently, as illustrated in FIG. 3(d), the molten metal 310 is tapped from the bottom portion of the ladle 309 to be transferred to a ladle refining furnace 311. The ladle refining furnace 311 is provided with a porous plug 313 at the bottom portion thereof and argon bubbling is performed by sending an argon gas 314 from a gas supplier (not illustrated) to the inside of the furnace through the porous plug 313. When the argon bubbling is performed, the molten metal 310 transferred to the ladle refining furnace 311 is made more uniform by stirring and impurity elements such as O and N are degassed.

In the ladle refining furnace 311, as illustrated in FIG. 3(e), first, a primary heat treatment of the molten metal 310 is performed. When the molten metal 310 transferred to the ladle refining furnace 311 is heated by generating arc discharge by the electrodes 304, and bottom blown argon bubbling through the porous plug 313 is continuously performed, the element component and the temperature can be made uniform.

Subsequently, as illustrated in FIG. 3(f), the molten metal 310 is subjected to a degassing treatment by using a vacuum degassing apparatus 316. The vacuum degassing apparatus 316 is configured such that the pressure in the apparatus is reduced through an exhaust hole 317 connected with a vacuum pump (not illustrated) and the vacuum degassing apparatus vertically moves with respect to the ladle refining furnace 311 so that the molten metal 310 is sucked up to perform the degassing treatment on gas contained in the molten metal 310. Incidentally, in FIG. 3(f), a DH vacuum degassing furnace (Dortmund Horde type) having one immersion tube is schematically illustrated as the vacuum degassing apparatus 316; however, a form in which the ladle smelting furnace 311 is not provided with an immersion tube and is covered with a shroud may be employed or a form of an RH vacuum degassing furnace (Ruhrstahl Heraeus type) or an RH injection furnace may be employed.

In the degassing treatment, when argon bubbling is performed in a state where pressure of gas phase atmosphere in the apparatus is reduced by the vacuum degassing apparatus 316, gas of the impurity elements which is degassed from the molten metal 310 can be efficiently exhausted. During the degassing treatment, a decrease in temperature is prevented by heating the molten metal 310 using a heater (not illustrated) and a powder for desulfurization is appropriately injected to the molten metal 310. When the molten metal 310 is subjected to such a degassing treatment, the molten metal 310 in which the concentration of each impurity element such as S, O, or H is decreased can be obtained.

Subsequently, in the ladle refining furnace 311, as illustrated in FIG. 3(g), a secondary heat treatment of the molten metal 310 is performed. In the secondary heat treatment, the element composition and the temperature of the molten metal 310 are finally adjusted.

Subsequently, as illustrated in FIG. 3(h), the molten metal 310 of the ladle refining furnace 311 is subjected to a casting treatment. The molten metal 310 is tapped from the bottom portion of the ladle refining furnace 311 to be transferred to a tundish 318, and the impurity elements are separated as the slag in the tundish 318. Then, the molten metal 310 is tapped from the bottom portion of the tundish 318 and is poured into a mold 321 disposed in a vacuum container 319. A vacuum pump (not illustrated) is connected to the vacuum container 319 through an exhaust hole 320 so that the inside of the container provided with the mold 321 is configured to be reduced pressure atmosphere. In this way, when the molten metal 310 poured into the mold 321 is cooled, an alloy ingot 322 having an arbitrary shape is casted. When the molten metal 310 is subjected to the casting treatment under reduced pressure atmosphere, it is possible to obtain an alloy in which the concentration of impurity elements such as N, O, and H is decreased.

The alloy refined by the method as described above can be used as a base metal for preparing an alloy powder to be used in the powder preparation step. The alloy has a decreased concentration of impurity elements and high cleanliness by the multiple refining which uses the vacuum carbon deoxidation method, and thus is suitable for preparation of an alloy powder which is configured by particles having high uniformity of the element composition distribution and also has high uniformity of the element composition between particles. From the viewpoint of maintaining the cleanliness of the alloy refined in this way, upon the preparation of an alloy powder, as a preferred embodiment, a powderization step using the vacuum carbon deoxidation method is performed.

The powderization step using the vacuum carbon deoxidation method can be performed by using a vacuum furnace 324 directly connected with a gas atomizer as illustrated in FIG. 3(i). The vacuum furnace 324 is regarded as an electric furnace which is provided with electrodes 304 generating arc discharge in the furnace, a gas injection lance (not illustrated) blowing argon gas into the furnace, and an exhaust hole (not illustrated) connected with a vacuum pump. A nozzle 328 is provided at the bottom portion of the vacuum furnace 324, and an atomization chamber 330 is provided at the lower side of the nozzle 328 so as to air-tightly cover the outlet of the nozzle 328. In addition, a gas injection hole 329 blowing an inert gas such as argon gas to a molten metal 326 flowing down from the nozzle 328 is provided at the side of the outlet of the nozzle 328.

In the vacuum furnace 324, the alloy obtained by multiple refining is put into the furnace and arc discharge is generated between the electrodes 304 and the alloy to thereby form the molten metal 326 of the alloy. Incidentally, the temperature of the molten metal 326 to be heated is in a temperature range of higher than 1600° C. but 2500° C. or lower. The molten metal 326 is subjected to a degassing treatment under reduced pressure atmosphere by the vacuum pump connected to the exhaust hole (not illustrated) while argon bubbling is performed, and thus the concentration of impurity elements such as N, O, and H is further decreased. Then, the molten metal 326 in a state where cleanliness thereof is maintained by performing the degassing treatment flows down from the nozzle 328. Thereafter, the molten metal 328 flowing down is micronized by blowing of the inert gas injected from the gas injection hole 329 and is solidified in the atomization chamber 330 to form a powder 331, and the powder 331 is accumulated at the bottom portion.

The vacuum furnace 324 may be a heat-resistance and fire-resistance heating furnace that melts a high-entropy alloy having a relatively high melting point, and the furnace wall may be a water-cooled type or the like. As the furnace wall of the vacuum furnace 324, for example, black lead (graphite), quartz ($SiO_2$), alumina ($Al_2O_3$), magnesia (MgO), alumina ceramics formed by a mixed sintered body such as $Al_2O_3.SiO_2.Fe_2O_3.Na_2O$, mullite ceramics formed by a mixed sintered body such as $Al_2O_3.SiO_2.Fe_2O_3.TiO_2$, magnesia ceramics formed by a mixed sintered body such as $Al_2O_3.MgO.SiO_2.CaO.Fe_2O_3$, zirconia ceramics formed by a mixed sintered body such as $Al_2O_3.MgO.ZrO_2.SiO_2.CaO.Fe_2O_3.TiO_2$, spinel ceramics formed by a mixed sintered body such as $Al_2O_3.MgO.SiO_2.CaO.Fe_2O_3$, calcia ceramics formed by a mixed sintered body such as $Al_2O_3.MgO.SiO_2.CaO.Fe_2O_3$, silica ceramics formed by a mixed sintered body such as $Al_2O_3.SiO_2.Fe_2O_3.TiO_2$, and the like are preferably applied. In particular, when melting at an ultrahigh temperature range of about 1000° C. or higher is performed, it is preferable to perform coating with a carbide such as TiC, ZrC, HfC, NbC, or TaC.

Figure 4:
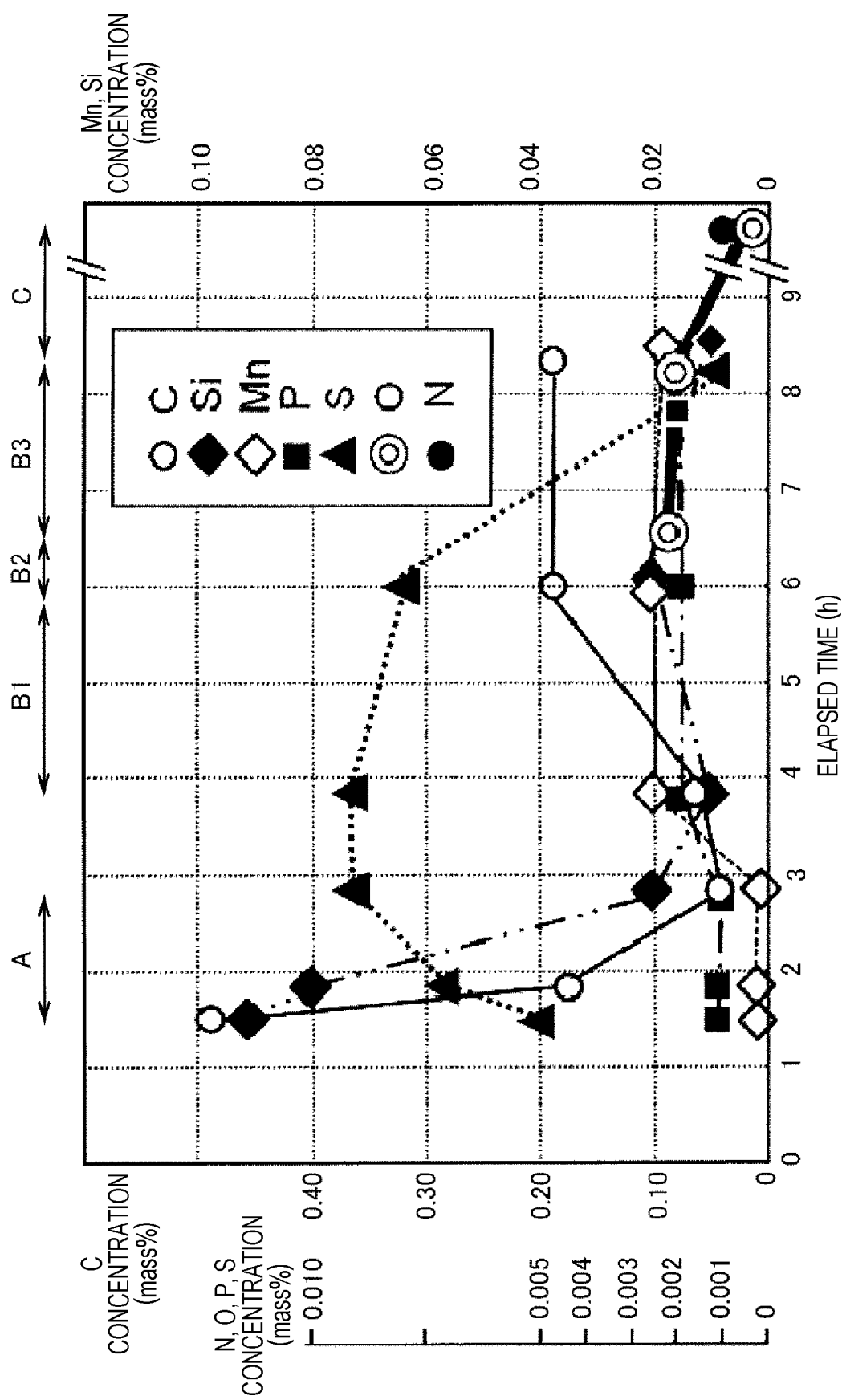
FIG. 4 is a diagram illustrating an example of concentration change transition of impurity elements in an alloy powder prepared by using a vacuum carbon deoxidation method.

FIG. 4 is a diagram illustrating an example of concentration change transition of impurity elements in an alloy powder prepared by using a vacuum carbon deoxidation method.

In FIG. 4, a change in concentration of each impurity element contained in a base metal of an alloy powder is measured over time and illustrated in the process of refining an alloy by using the vacuum carbon deoxidation method and performing a powderization treatment on the alloy to prepare an alloy powder. Incidentally, A time period corresponding to elapsed time of 1.5 h to 2.8 h corresponds to the peroxidation treatment (see FIG. 3(b)) in the electric furnace 301, B1 time period corresponding to elapsed time of 2.8 h to 6 h corresponds to the primary heat treatment (see FIG. 3(e)) in the ladle refining furnace 311, B2 time period corresponding to elapsed time of 6 h to 6.5 h corresponds to the degassing treatment (see FIG. 3(f)) in the ladle refining furnace 311, B3 time period corresponding to elapsed time of 6.5 h to 8.2 h corresponds to the secondary heat treatment (see FIG. 3(g)) in the ladle refining furnace 311, and C time period corresponding to time period subsequent to elapsed time of 8.2 h corresponds to the degassing treatment (see FIG. 3(i)) in the vacuum furnace 324.

As illustrated in FIG. 4, it is found that when the operations up to the secondary heat treatment are performed in the ladle refining furnace 311 by using the vacuum carbon deoxidation method, the concentration of C may be decreased to 0.18 wt %, the concentration of Si may be decreased to 0.01 wt %, the concentration of Mn may be decreased to 0.019 wt %, the concentration of P may be decreased to 0.001 wt %, and the concentration of S may be decreased to 0.001 wt %, and when the operations up to the degassing treatment are performed in the vacuum furnace 324, the concentration of O may be decreased to 0.0003 wt % (3 ppm) and the concentration of N may be decreased to 0.001 wt % (10 ppm). In this way, when the number of times of slag separation, the time for degassing treatment, and the like are appropriately adjusted in the process of preparing an alloy powder by using the vacuum carbon deoxidation method, the concentration of each of impurity elements such as P, Si, S, Sn, Sb, As, Mn, O, and N can be controlled to a desired range. Incidentally, when an element such as P, Si, Sn, Sb, As, or Mn is contained as a non-Fe main component element in the alloy structure, a base metal may be selected in anticipation of the concentration decrease in the refining process or the number of times of slag separation or the like may be appropriately adjusted.

The alloy structure according this embodiment described above can be applied as a structural member, a mechanism member, or the like. The alloy structure can be formed in an arbitrary shape as long as the additive manufacturing can be performed and can be formed to have an arbitrary dimension in which a length dimension is more than 70 mm and a volume is more than 5495 mm$^3$. The alloy structure can be used for application in severe environment such as high-temperature environment, high radiation dosage environment, or highly corrosive environment as well as normal environment. Moreover, since the atomic diffusion rate under high temperature is high and physical properties can be stably maintained, the alloy structure can be suitably used for application to be exposed in high-temperature environment for a long time. More specifically, for example, the alloy structure can be used for application for plant constructional materials including a casing, a pipe, a valve, and the like, power generator constructional materials, nuclear reactor constructional materials, aerospace constructional materials, members for hydraulic equipment, turbine members including a turbine blade and the like, boiler members, engine members, nozzle members, or mechanism members for various devices such as a bearing and a piston. Further, when the alloy structure according to this embodiment is applied to cover the surface of a structure such as a metal or alloy structural member or mechanism member, the alloy structure can also be used as a diffusion barrier layer or the like serving as a barrier for heat-resistant coating, corrosion-resistant coating, wear-resistant coating, or atom diffusion. Furthermore, the alloy structure can also be applied to tools such as a friction stir welding (FSW) tool, and can be suitably used for a wide range of application including friction stir welding of an iron-based material which requires high high-temperature strength or wear resistance.

EXAMPLES

Hereinafter, the present invention will be described in more detail by means of Examples of the present invention; however, the technical scope of the present invention is not limited thereto.

Alloy structures related to Example 1-1 to Example 1-4 and Example 2-1 to Example 2-3 were produced as Examples of the present invention, and observation of the solidification structure and evaluation on the element composition distribution and mechanical characteristics were carried out. Further, as comparison to Examples, alloy structures related to Comparative Example 1-1 to Comparative Example 1-4 and Comparative Example 2-1 to Comparative Example 2-4 were produced and were evaluated along with Examples.

Example 1-1

As Example 1-1, an alloy structure having an element composition represented by $Al_{0.3}CoCrFeNi$ was produced by additive manufacturing. Regarding the atomic concentration ratio, the atomic concentration of Al was about 7 at % and the atomic concentration of each of Co, Cr, Fe, and Ni was about 23.3 at %.

First, an alloy powder was prepared according to a gas atomizing method by using, as a base metal, an alloy in which the atomic concentration of Al was about 7 at % and the atomic concentration of each of Co, Cr, Fe, and Ni was about 23.3 at %. Then, the obtained alloy powder was classified such that the particle size distribution was limited to a range of 50 μm or more but 100 μm or less and the volume-based average particle size was adjusted to about 70 μm.

Subsequently, an alloy structure was manufactured on a substrate by using an additive manufacturing apparatus. A plate-shaped mechanical structural carbon steel "S45C" having a size of 100 mm×100 mm×10 mm was used as the substrate. Further, an electron beam melting additive manufacturing apparatus "A2X" (manufactured by Arcam AB) using an electron beam as a heat source was used as the additive manufacturing apparatus. In the additive manufacturing apparatus, the powder extending step and the solidified layer manufacturing step were repeatedly performed on the substrate under vacuum atmosphere to produce a cylindrical alloy structure having a diameter of 10 mm and a height of 50 mm. At this time, the melting of the alloy powder was carried out while the preliminary heating at a temperature of 50% to 80% of the melting point (Tm) of the alloy was carried out in advance, so that the scattering of the extended alloy powder was suppressed. Thereafter, the alloy structure was separated from the substrate.

Example 1-2

As Example 1-2, an alloy structure having an element composition represented by AlCoCrFeNi was produced by additive manufacturing. Regarding the atomic concentration ratio, the atomic concentration of each of Al, Co, Cr, Fe, and Ni was about 20.0 at %.

The alloy structure related to Example 1-2 was produced in the same manner as in Example 1-1, except that the composition of a base metal used in preparation of an alloy powder was changed.

Comparative Example 1-1

As Comparative Example 1-1, an alloy structure having an element composition represented by $Al_{0.3}CoCrFeNi$ was produced by casting. Regarding the atomic concentration ratio, the atomic concentration of Al was about 7 at % and the atomic concentration of each of Co, Cr, Fe, and Ni was about 23.3 at %.

First, an alloy powder was prepared according to a gas atomizing method by using, as a base metal, an alloy in which the atomic concentration of Al was about 7 at % and the atomic concentration of each of Co, Cr, Fe, and Ni was about 23.3 at %. Then, the obtained alloy powder was classified such that the particle size distribution was limited to a range of 50 μm or more but 100 μm or less and the volume-based average particle size was adjusted to about 70 μm.

Subsequently, the obtained alloy powder was put in an alumina crucible and melted by high-frequency induction heating under vacuum atmosphere, and then the melted product was poured into a water-cooled mold made of copper and cooled and solidified to thereby produce a cylindrical alloy structure having a diameter of 10 mm and a height of 50 mm.

Comparative Example 1-2

As Comparative Example 1-2, an alloy structure having an element composition represented by $Al_{0.2}CoCrFeNi$ was produced by additive manufacturing. Regarding the atomic concentration ratio, the atomic concentration of Al was about 4.8 at % and the atomic concentration of each of Co, Cr, Fe, and Ni was about 23.8 at %.

The alloy structure related to Comparative Example 1-2 was produced in the same manner as in Example 1-1, except that the composition of a base metal used in preparation of an alloy powder was changed.

Example 1-3

As Example 1-3, an alloy structure having an element composition represented by $Al_{1.5}CoCrFeNi$ was produced by additive manufacturing. Regarding the atomic concentration ratio, the atomic concentration of Al was about 27.2 at % and the atomic concentration of each of Co, Cr, Fe, and Ni was about 18.2 at %.

First, an alloy powder was prepared according to a gas atomizing method by using, as a base metal, an alloy in which the atomic concentration of Al was about 27.2 at % and the atomic concentration of each of Co, Cr, Fe, and Ni was about 18.2 at %. Then, the obtained alloy powder was classified such that the particle size distribution was limited to a range of 20 μm or more but 50 μm or less and the volume-based average particle size was adjusted to about 30 μm.

Subsequently, an alloy material was manufactured on a substrate by using an additive manufacturing apparatus. A cylindrical mechanical structural carbon steel "S45C" having a diameter of 10 mm and a height of 50 mm was used as the substrate. Further, a laser melting additive manufacturing apparatus "EOSINT M270" (manufactured by EOS GmbH) using a laser beam as a heat source was used as the additive manufacturing apparatus. In the additive manufacturing apparatus, the powder extending step and the solidified layer manufacturing step were repeatedly performed on the substrate under nitrogen atmosphere to produce a multilayer alloy material having a size of 200 μm.

Comparative Example 1-3

As Comparative Example 1-3, an alloy structure having an element composition represented by AlCoCrFeNi was produced by thermal spraying. Regarding the atomic concentration ratio, the atomic concentration of each of Al, Co, Cr, Fe, and Ni was about 20.0 at %.

First, each metal powder of Al, Co, Cr, Fe, and Ni was mixed such than the atomic concentration of each of Al, Co, Cr, Fe, and Ni became about 20.0 at %. Incidentally, each metal powder was classified such that the particle size distribution was limited to a range of 50 μm or more but 150 μm or less and the volume-based average particle size was adjusted to about 70 μm.

Subsequently, the mixed metal powder was thermally sprayed on a substrate under nitrogen atmosphere by a plasma spraying method to thereby produce a membrane-like alloy structure having a size of 200 μm. A cylindrical mechanical structural carbon steel "S45C" having a diameter of 100 mm and a height of 10 mm was used as the substrate.

Comparative Example 1-4

As Comparative Example 1-4, an alloy structure having an element composition represented by $Al_{2.0}CoCrFeNi$ was produced by additive manufacturing. Regarding the atomic concentration ratio, the atomic concentration of Al was about 33.3 at % and the atomic concentration of each of Co, Cr, Fe, and Ni was about 16.7 at %.

The alloy structure related to Comparative Example 1-4 was produced in the same manner as in Example 1-2, except that the composition of a base metal used in preparation of an alloy powder was changed.

Example 1-4

As Example 1-4, an alloy structure having an element composition represented by $AlCoCrFeNiMo_{0.5}$ was produced by additive manufacturing. Regarding the atomic concentration ratio, the atomic concentration of each of Al, Co, Cr, Fe, and Ni was about 18.2 at % and the atomic concentration of Mo was about 9.1 at %.

First, an alloy powder was prepared according to a gas atomizing method by using, as a base metal, an alloy in which the atomic concentration of each of Al, Co, Cr, Fe, and Ni was about 18.2 at % and the atomic concentration of Mo was about 9.1 at %. Then, the obtained alloy powder was classified such that the particle size distribution was limited to a range of 50 μm or more but 100 μm or less and the volume-based average particle size was adjusted to about 70 μm.

Subsequently, an alloy structure was manufactured on a substrate by using an additive manufacturing apparatus. A cylindrical mechanical structural carbon steel "S45C" having a diameter of 300 mm and a height of 10 mm was used as the substrate. Further, an electron beam melting additive manufacturing apparatus "A2X" (manufactured by Arcam AB) using an electron beam as a heat source was used as the additive manufacturing apparatus. In the additive manufacturing apparatus, the powder extending step and the solidified layer manufacturing step were repeatedly performed on the substrate under vacuum atmosphere to produce a substantially cylindrical impeller-shaped alloy structure having a diameter of 300 mm and a height of 100 mm. At this time, the melting of the alloy powder was carried out while the preliminary heating at a temperature of 50% to 80% of the melting point (Tm) of the alloy was carried out in advance, so that the scattering of the extended alloy powder was suppressed. Thereafter, the impeller-shaped alloy structure was separated from the substrate.

Example 2-1

As Example 2-1, an alloy structure which has an element composition represented by $Al_{0.3}CoCrFeNi$ and in which the concentration of inevitable impurities is limited was produced by additive manufacturing. Regarding the atomic concentration ratio, the atomic concentration of Al was about 7 at % and the atomic concentration of each of Co, Cr, Fe, and Ni was about 23.3 at %. Further, the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively.

The alloy structure related to Example 2-1 was produced in the same manner as in Example 1-1, except that the composition of a base metal used in preparation of an alloy powder was changed.

Example 2-2

As Example 2-2, an alloy structure which has an element composition represented by AlCoCrFeNi and in which the concentration of inevitable impurities is limited was produced by additive manufacturing. Regarding the atomic concentration ratio, the atomic concentration of each of Al, Co, Cr, Fe, and Ni was about 20.0 at %. Further, the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively.

The alloy structure related to Example 2-2 was produced in the same manner as in Example 1-1, except that the composition of a base metal used in preparation of an alloy powder was changed.

Comparative Example 2-1

As Comparative Example 2-1, an alloy structure which has an element composition represented by AlCoCrFeNi and in which the concentration of inevitable impurities is limited was produced by casting. Regarding the atomic concentration ratio, the atomic concentration of each of Al, Co, Cr, Fe, and Ni was about 20.0 at %. Further, the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively.

The alloy structure related to Comparative Example 2-1 was produced in the same manner as in Comparative Example 1-1, except that the composition of a base metal used in preparation of an alloy powder was changed.

Comparative Example 2-2

As Comparative Example 2-2, an alloy structure which has an element composition represented by $Al_{0.2}CoCrFeNi$ and in which the concentration of inevitable impurities is limited was produced by casting. Regarding the atomic concentration ratio, the atomic concentration of Al was about 4.8 at % and the atomic concentration of each of Co, Cr, Fe, and Ni was about 23.8 at %. Further, the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively.

The alloy structure related to Comparative Example 2-2 was produced in the same manner as in Example 1-1, except that the composition of a base metal used in preparation of an alloy powder was changed.

Example 2-3

As Example 2-3, an alloy structure which has an element composition represented by $Al_{1.5}CoCrFeNi$ and in which the concentration of inevitable impurities is limited was produced by additive manufacturing. Regarding the atomic concentration ratio, the atomic concentration of Al was about 27.2 at % and the atomic concentration of each of Co, Cr, Fe, and Ni was about 18.2 at %. Further, the concentrations of P, Si, S, Sn, Sb, As, Mn, O, and N were limited to 0.005 wt % or less, 0.040 wt % or less, 0.002 wt % or less, 0.005 wt % or less, 0.002 wt % or less, 0.005 wt % or less, 0.050 wt % or less, 0.001 wt % or less, and 0.002 wt % or less, respectively.

First, an alloy powder was prepared according to a gas atomizing method by using, as a base metal, an alloy in which the atomic concentration of Al was about 27.2 at %, the atomic concentration of each of Co, Cr, Fe, and Ni was about 18.2 at %, and the concentrations of P, Si, S, Sn, Sb, As, Mn, O, and N were limited to 0.005 wt % or less, 0.040 wt % or less, 0.002 wt % or less, 0.005 wt % or less, 0.002 wt % or less, 0.005 wt % or less, 0.050 wt % or less, 0.001 wt % or less, and 0.002 wt % or less, respectively. Then, the obtained alloy powder was classified such that the particle size distribution was limited to a range of 20 μm or more but 50 μm or less and the volume-based average particle size was adjusted to about 30 μm.

Subsequently, an alloy material was manufactured on a substrate by using an additive manufacturing apparatus. A cylindrical mechanical structural carbon steel "S45C" having a diameter of 100 mm and a height of 10 mm was used as the substrate. Further, a laser melting additive manufacturing apparatus "EOSINT M270" (manufactured by EOS GmbH) using a laser beam as a heat source was used as the additive manufacturing apparatus. In the additive manufacturing apparatus, the powder extending step and the solidified layer manufacturing step were repeatedly performed on the substrate under nitrogen atmosphere to produce a multilayer alloy material having a size of 200 μm.

Comparative Example 2-3

As Comparative Example 2-3, an alloy structure which has an element composition represented by AlCoCrFeNi and in which the concentration of inevitable impurities is limited was produced by thermal spraying. Regarding the atomic concentration ratio, the atomic concentration of each of Al, Co, Cr, Fe, and Ni was about 20.0 at %. Further, the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively.

First, each metal powder of Al, Co, Cr, Fe, and Ni was mixed in which the atomic concentration of each of Al, Co, Cr, Fe, and Ni was about 20.0 at %, and the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively. Incidentally, each metal powder was classified such that the particle size distribution was limited to a range of 50 μm or more but 150 μm or less and the volume-based average particle size was adjusted to about 70 μm.

Subsequently, the mixed metal powder was thermally sprayed on a substrate under nitrogen atmosphere by a plasma spraying method to thereby produce a membrane-like alloy structure having a size of 200 μm. A cylindrical mechanical structural carbon steel "S45C" having a diameter of 100 mm and a height of 10 mm was used as the substrate.

Comparative Example 2-4

As Comparative Example 2-4, an alloy structure which has an element composition represented by $Al_{2.0}CoCrFeNi$ and in which the concentration of inevitable impurities is limited was produced by additive manufacturing. Regarding the atomic concentration ratio, the atomic concentration of Al was about 33.3 at % and the atomic concentration of each of Co, Cr, Fe, and Ni was about 16.7 at %. Further, the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively.

The alloy structure related to Comparative Example 2-4 was produced in the same manner as in Example 2-2, except that the composition of a base metal used in preparation of an alloy powder was changed.

Next, the observation of the solidification structure, the analysis of the nickel concentration distribution, and hardness measurement were performed on the produced alloy structures related to Example 1-1 to Example 1-4 and Example 2-1 to Example 2-3 and the produced alloy structures related to Comparative Example 1-1 to Comparative Example 1-4 and Comparative Example 2-1 to Comparative Example 2-4. Incidentally, the observation of the solidification structure was performed by confirming the crystalline structure and the average grain size with a high-resolution transmission electron microscope. Further, the analysis of the nickel concentration distribution was performed by measuring the nickel concentration in arbitrarily-extracted ten regions with a scanning electron microscope-energy dispersive X-ray detector (SEM-EDX). Furthermore, the hardness measurement was performed by measuring a Vickers hardness (Hv) of arbitrarily-extracted ten points of the alloy material. The test load was set to 100 gf and the holding time was set to 10 seconds.

The results of the observation of the solidification structure, the analysis of the nickel concentration distribution, and the hardness measurement are presented in Table 1. The section of the element composition in Table 1 represents an atomic concentration ratio of the main component element to the additional element. Further, in the section of the impurities, "±" represents an example in which inevitable impurities are not limited, "-" represents an example in which inevitable impurities are slightly limited, and "--" represents an example in which inevitable impurities are limited. Furthermore, the section "Crystalline structure" represents the crystalline structure of the main crystal. "*" in the section "Hardness" represents a case in which breakage occurs.

TABLE 1

| | Element composition | Impurities | Crystalline structure | Average particle size (μm) | Nickel distribution (at %) Average value | Nickel distribution (at %) Standard deviation | Hardness (Hv) Average value | Hardness (Hv) Standard deviation |
|---|---|---|---|---|---|---|---|---|
| Example 1-1 | $Al_{0.3}CoCrFeNi$ | ± | Face-centered | 5.2 | 23.0 | 2.0 | 160 | 12 |
| Example 1-2 | AlCoCrFeNi | ± | Body-centered | 3.4 | 20.5 | 1.2 | 560 | 10 |
| Example 1-3 | $Al_{1.5}CoCrFeNi$ | ± | Body-centered | 2.5 | 19.5 | 1.5 | 620 | 15 |
| Example 1-4 | $AlCoCrFeNiMo_{0.5}$ | ± | Body-centered | 4.8 | 16.2 | 2.1 | 650 | 20 |
| Comparative Example 1-1 | $Al_{0.3}CoCrFeNi$ | ± | Face-centered + Body-centered | 125.0 | 23.0 | 8.5 | 145 | 47 |
| Comparative Example 1-2 | $Al_{0.2}CoCrFeNi$ | ± | Face-centered + Body-centered | 7.5 | 24.0 | 2.0 | 100 | 15 |
| Comparative Example 1-3 | AlCoCrFeNi | ± | Face-centered + Body-centered | 12.7 | 23.0 | 14.0 | 595 | 54 |
| Comparative Example 1-4 | $Al_{2.0}CoCrFeNi$ | ± | Body-centered + B2-type intermetallic compound | 3.6 | 17.2 | 2.0 | *690 | 20 |
| Example 2-1 | $Al_{0.3}CoCrFeNi$ | -- | Face-centered | — | 23.0 | 2.1 | 158 | 11 |
| Example 2-2 | AlCoCrFeNi | -- | Body-centered | — | 20.4 | 1.2 | 477 | 9 |
| Example 2-3 | $Al_{1.5}CoCrFeNi$ | -- | Body-centered | — | 19.4 | 1.5 | 537 | 13 |
| Comparative Example 2-1 | AlCoCrFeNi | -- | Face-centered + Body-centered | — | 23.0 | 14.2 | 143 | 45 |
| Comparative Example 2-2 | $Al_{0.2}CoCrFeNi$ | -- | Face-centered + Body-centered | — | 24.2 | 2.1 | 98 | 13 |
| Comparative Example 2-3 | AlCoCrFeNi | -- | Face-centered + Body-centered | — | 23.1 | 14.3 | 592 | 80 |
| Comparative Example 2-4 | $Al_{2.0}CoCrFeNi$ | -- | Body-centered + B2-type intermetallic compound | — | 17.3 | 2.2 | *668 | 19 |

As presented in Table 1, it is found that the alloy structures related to Example 1-1 to Example 1-4 and Example 2-1 to Example 2-3 have any one crystalline structure of a face-centered cubic lattice and a body-centered cubic lattice. In addition, from the nickel concentration distribution and the hardness value, it is found that the standard deviation is small and the uniformity in the distribution of the element composition and the mechanical strength is high. Further, from the observation of the solidification structure, the solidification structure and the crystalline structure as illustrated in FIGS. 2(a) and 2(b) were found. Regarding the impeller-shaped alloy structure related to Example 1-4, it was separately found that the amount of corrosion thickness reduction at the time of the salt water (artificial seawater) corrosion test is further suppressed as compared to austenite stainless steel (SUS304) and it was also found that the alloy structure is suitably used as a structural member for corrosion resistance, a mechanism member for corrosion resistance, and the like.

On the other hand, it is found that the alloy structures related to Comparative Example 1-1 to Comparative Example 1-4 and Comparative Example 2-1 to Comparative Example 2-4 have large standard deviations of the nickel concentration distribution and the hardness value and low uniformity in the distribution of the element composition and the mechanical strength. Further, it is found that the crystalline structure is reflected by the low uniformity of the element composition and the dual-phase structure is formed. In particular, it is found that when the atomic concentration of Al is decreased, the hardness is maintained to a value lower than that of soft steel, and the alloy structure is not suitable as a structural member, a mechanism member, and the like. Moreover, it is found that when the atomic concentration of Al is increased, a B2-type intermetallic compound is generated, breakage occurs at the time of the test, and thus the alloy structure is not suitable as a structural member, a mechanism member, and the like.

In general, since thermal degradation, wear, corrosion, or the like proceeds in a low-resistance region of the structural member, the mechanism member, or the like as a starting point, in consideration of rolling or the like, it is desirable that both of the hardness and the ductibility are achieved in the structural member, the mechanism member, or the like. In addition, it can be said that there is also a demand for minimizing the deviation of these properties. From such viewpoints, based on the results of the alloy structures related to Example 1-1 to Example 1-4 and Example 2-1 to Example 2-3 and the alloy structures related to Comparative Example 1-1 to Comparative Example 1-4 and Comparative Example 2-1 to Comparative Example 2-4, it can be said that the uniformity in the distribution of the element composition and the mechanical strength of the present invention is extremely advantageous in the case of improving the characteristics of the structural member, the mechanism member, or the like.

Next, alloy structures related to Example 3-1 and Example 3-2 were produced as Examples of the present invention, and then the evaluation on stress-strain characteristics was performed.

Figure 5:
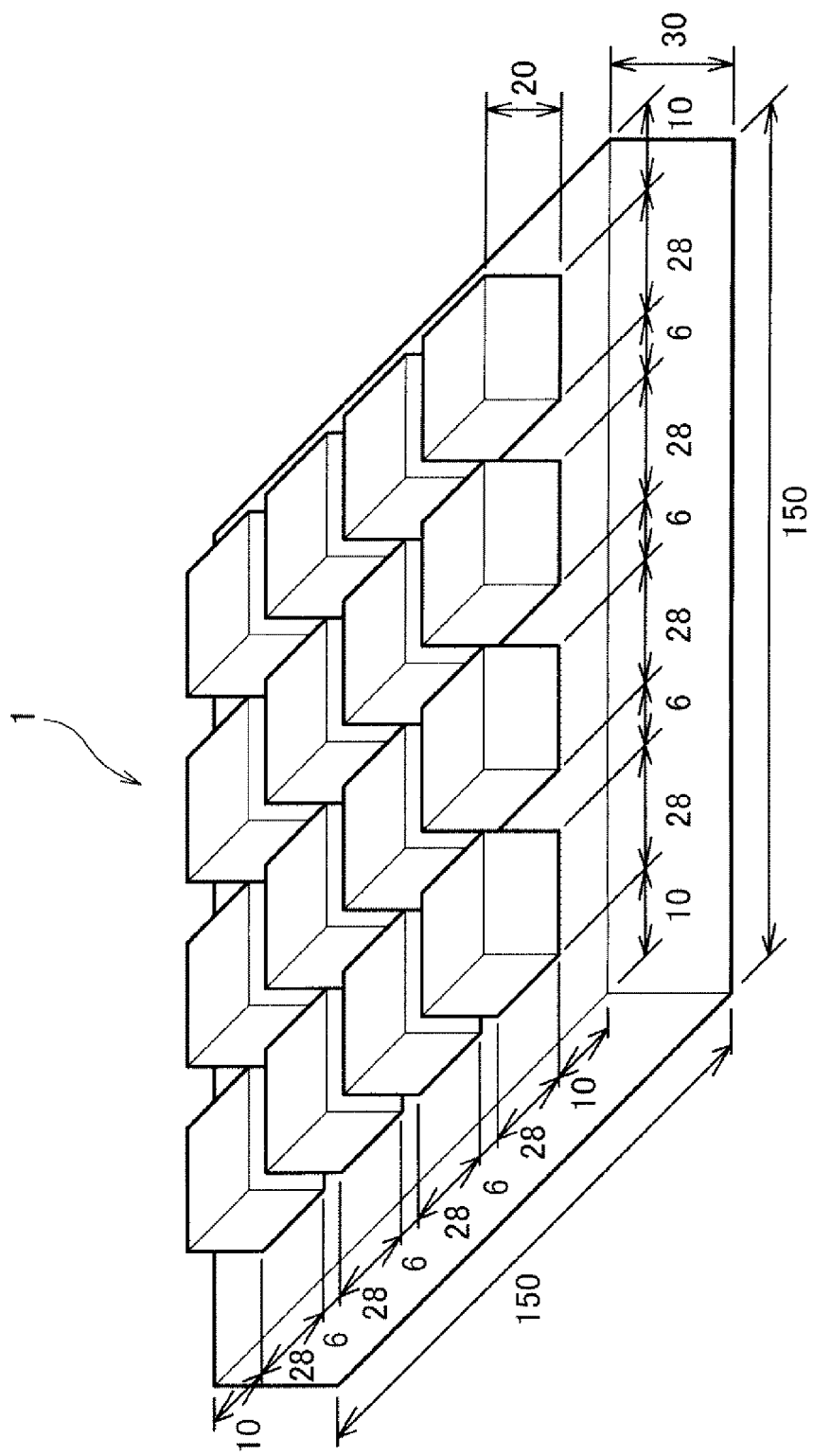
FIG. 5 is a diagram illustrating the shape dimension of an alloy structure related to Example 3.

FIG. 5 is a diagram illustrating the shape dimension of an alloy structure related to Example 3.

Example 3-1

As Example 3-1, an alloy structure illustrated in FIG. 5 which has an element composition represented by AlCoCrFeNi and in which the concentration of inevitable impurities is limited was produced by additive manufacturing. Regarding the atomic concentration ratio, the atomic concentration of each of Al, Co, Cr, Fe, and Ni was about 20.0 at %. Further, the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively.

First, an alloy powder was prepared according to a gas atomizing method by using, as a base metal, an alloy in which the atomic concentration of Al was about 7 at %, the atomic concentration of each of Co, Cr, Fe, and Ni was about 23.3 at %, and the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively. Then, the obtained alloy powder was classified such that the particle size distribution was limited to a range of 45 μm or more but 105 μm or less and the volume-based average particle size was adjusted to about 70 μm.

Subsequently, an alloy material was manufactured on a substrate by using an additive manufacturing apparatus. A plate-shaped mechanical structural carbon steel "S45C" having a size of 200 mm×200 mm×10 mm was used as the substrate. Further, an electron beam melting additive manufacturing apparatus "A2X" (manufactured by Arcam AB) using an electron beam as a heat source was used as the additive manufacturing apparatus. In the additive manufacturing apparatus, the powder extending step and the solidified layer manufacturing step were repeatedly performed on the substrate under vacuum atmosphere to form a plate-shaped manufactured object (plate-shaped portion) having a size of 150 mm×150 mm×30 mm as illustrated in FIG. 5, and then 16 rectangular parallelepiped manufactured objects (rectangular parallelepiped portions) having a size of 28 mm×28 mm×20 mm were manufactured on the plate-shaped manufactured object with horizontal and vertical intervals of 6 mm. At this time, the melting of the alloy powder was carried out while the preliminary heating at a temperature of 50% to 80% of the melting point (Tm) of the alloy powder was carried out in advance, so that the scattering of the extended alloy powder was suppressed. Incidentally, the volume of the entire manufactured object was 925880 mm³.

Example 3-2

As Example 3-2, an alloy structure illustrated in FIG. 5 which has an element composition represented by AlCoCr-FeNi and in which the concentration of inevitable impurities is limited was produced by additive manufacturing. Regarding the atomic concentration ratio, the atomic concentration of each of Al, Co, Cr, Fe, and Ni was about 20.0 at %.

The alloy structure related to Example 3-2 was produced in the same manner as in Example 3-1, except that the composition of a base metal used in preparation of an alloy powder was changed. Incidentally, the concentration of inevitable impurities in the alloy powder was as follows: P: 0.008 wt %, Si: 0.040 wt %, S: 0.012 wt %, Sn: 0.006 wt %, Sb: 0.002 wt %, As: 0.006 wt %, Mn: 0.300 wt %, O: 0.002 wt %, and N: 0.003 wt %.

Next, the analysis of the nickel concentration distribution was performed on the produced alloy structures related to Example 3-1 and Example 3-2. The analysis of the nickel concentration distribution was performed on total 16 rectangular parallelepiped portions by measuring the nickel concentration in arbitrarily-extracted ten regions with a scanning electron microscope-energy dispersive X-ray detector (SEM-EDX). The results of an average value and a standard deviation of the Ni concentration distribution of total 16 rectangular parallelepiped portions are presented in Table 2.

TABLE 2

| Nickel distribution (at %) | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Example 3-1 | Average value | 20.1 | 20.3 | 20.4 | 20.0 | 19.9 | 19.9 | 20.0 | 20.1 | 20.1 | 20.2 | 20.2 | 20.3 | 20.9 | 20.4 | 20.5 | 20.4 |
| | Standard deviation | 1.20 | 1.18 | 1.00 | 1.22 | 1.11 | 1.18 | 1.20 | 1.20 | 1.11 | 1.09 | 1.30 | 1.20 | 1.20 | 1.21 | 1.13 | 1.91 |
| Example 3-2 | Average value | 20.2 | 20.4 | 20.6 | 20.2 | 20.1 | 20.2 | 20.1 | 20.2 | 20.3 | 20.4 | 20.5 | 20.8 | 21.2 | 21.4 | 21.2 | 21.5 |
| | Standard deviation | 1.23 | 1.51 | 1.32 | 1.42 | 1.32 | 1.20 | 1.33 | 1.31 | 1.26 | 1.43 | 1.28 | 1.31 | 1.33 | 1.19 | 1.20 | 1.98 |

As presented in Table 2, it is found that in the alloy structure related to Example 3-1 in which inevitable impurities are further limited, the deviation of the nickel concentration distribution in each rectangular parallelepiped portion tends to be smaller than that of the alloy structure related to Example 3-2, and when the inevitable impurities of the alloy powder are further limited, the uniformity in the distribution of the element composition of the alloy structure is increased.

Next, test pieces were collected from total 16 rectangular parallelepiped portions of the alloy structure illustrated in FIG. 5 along the laminating direction, and then a uniaxial compression test was performed. Regarding the test pieces, dumbbell-shaped test pieces having the laminating direction of the alloy structure as a long axis were cut from each rectangular parallelepiped portion to the plate-shaped portion, the dimension of the parallel portion thereof was adjusted to have a size of 4 mm (diameter)×30 mm (height), and then the obtained dumbbell-shaped test pieces were used. The measurement results of the compressive true stress-compressive true strain curve in room temperature were represented in FIG. 6 as the average of total 16 rectangular parallelepiped portions.

Figure 6:
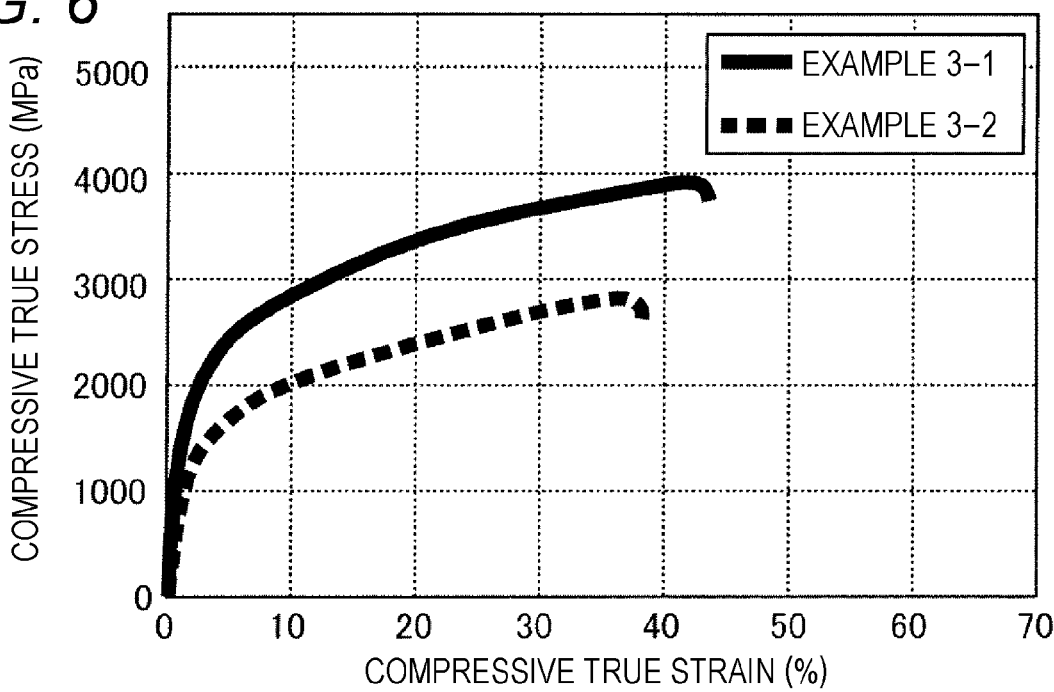
FIG. 6 is a compressive true stress-compressive true strain curve in the alloy structure related to Example 3.

FIG. 6 is a compressive true stress-compressive true strain curve in the alloy structure related to Example 3.

As illustrated in FIG. 6, a variation in the true stress-true strain curve was not almost recognized in any of Example 3-1 and Example 3-2, and thus the curve with a line width illustrated in FIG. 6 could be drawn. That is, it can be found that in the alloy structure having a volume about 160 times or more than that of the alloy material disclosed in NPL 2, the uniformity of the mechanical characteristics is increased over the entire region of the manufactured object. In particular, while the tensile strength is about 2800 MPa and the total elongation is about 38% in Example 3-2, in Example 3-1, the tensile strength is about 3850 MPa, the total elongation is about 43%, and thus it is found that the tensile strength is increased by about 1.37 times, and the total elongation is increased by about 1.1 times. Therefore, it is found that when the concentration of inevitable impurities is decreased, mechanical characteristics can be further improved.

Next, as Examples of the present invention, alloy structures related to Example 4-1 to Example 4-3 were produced, and the evaluation on tensile characteristics was performed.

Example 4-1

As Example 4-1, an alloy structure which has an element composition represented by AlCoCrFeNi and in which the concentration of inevitable impurities is limited was produced by additive manufacturing. Regarding the atomic concentration ratio, the atomic concentration of each of Al, Co, Cr, Fe, and Ni was about 20.0 at %. Further, the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively.

First, an alloy powder was prepared according to a gas atomizing method by using, as a base metal, an alloy in which the atomic concentration of Al was about 7 at %, the atomic concentration of each of Co, Cr, Fe, and Ni was about 23.3 at %, and the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively. Then, the obtained alloy powder was classified such that the particle size distribution was limited to a range of 45 μm or more but 105 μm or less and the volume-based average particle size was adjusted to about 70 μm.

Subsequently, an alloy structure was manufactured on a substrate by using an additive manufacturing apparatus. A plate-shaped mechanical structural carbon steel "S45C" having a size of 200 mm×200 mm×10 mm was used as the substrate. Further, an electron beam melting additive manufacturing apparatus "A2X" (manufactured by Arcam AB) using an electron beam as a heat source was used as the additive manufacturing apparatus. In the additive manufacturing apparatus, the powder extending step and the solidified layer manufacturing step were repeatedly performed on the substrate under vacuum atmosphere to manufacture a dumbbell-shaped test piece, which has a laminating direction of the solidified layer as a horizontal axis, as an alloy structure. At this time, the melting of the alloy powder was carried out while the preliminary heating at a temperature of 50% to 80% of the melting point (Tm) of the alloy powder was carried out in advance, so that the scattering of the extended alloy powder was suppressed. Incidentally, the dumbbell-shaped test piece was manufactured in a horizontal state on the substrate together with a support member supporting the test piece main body and the dimension of the parallel portion thereof was adjusted to have a size of 4 mm (diameter)×30 mm (height).

Example 4-2

As Example 4-2, an alloy structure which has an element composition represented by AlCoCrFeNi and in which the concentration of inevitable impurities is limited was produced by additive manufacturing. Regarding the atomic concentration ratio, the atomic concentration of each of Al, Co, Cr, Fe, and Ni was about 20.0 at %. Further, the concentrations of P, Si, S, Sn, Sb, As, Mn, O, and N were adjusted to 0.002 wt % to 0.005 wt %, 0.010 wt % to 0.040 wt %, 0.001 wt % to 0.002 wt %, 0.002 wt % to 0.005 wt %, 0.001 wt % to 0.002 wt %, 0.001 wt % to 0.005 wt %, 0.020 wt % to 0.050 wt %, 0.0003 wt % to 0.001 wt %, and 0.001 wt % to 0.002 wt %, respectively.

The alloy structure related to Example 4-2 was produced in the same manner as in Example 4-1, except that the composition of a base metal used in preparation of an alloy powder was changed.

Example 4-3

As Example 4-3, an alloy structure which has an element composition represented by AlCoCrFeNi and the concentration of inevitable impurities is not limited was produced by additive manufacturing. Regarding the atomic concentration ratio, the atomic concentration of each of Al, Co, Cr, Fe, and Ni was about 20.0 at %.

The alloy structure related to Example 4-3 was produced in the same manner as in Example 4-1, except that the composition of a base metal used in preparation of the alloy powder was changed. Incidentally, the concentration of the inevitable impurities in the alloy powder was as follows: P: 0.008 wt %, Si: 0.040 wt %, S: 0.012 wt %, Sn: 0.006 wt %, Sb: 0.002 wt %, As: 0.006 wt %, Mn: 0.300 wt %, O: 0.002 wt %, and N: 0.003 wt %.

Next, the tensile test was performed on the produced alloy structures related to Example 4-1 to Example 4-3. The tensile test was performed at a temperature of 0° C. to 900° C., and then the tensile strength was measured. The measurement results of the tensile test are presented in FIG. 7.

Figure 7:
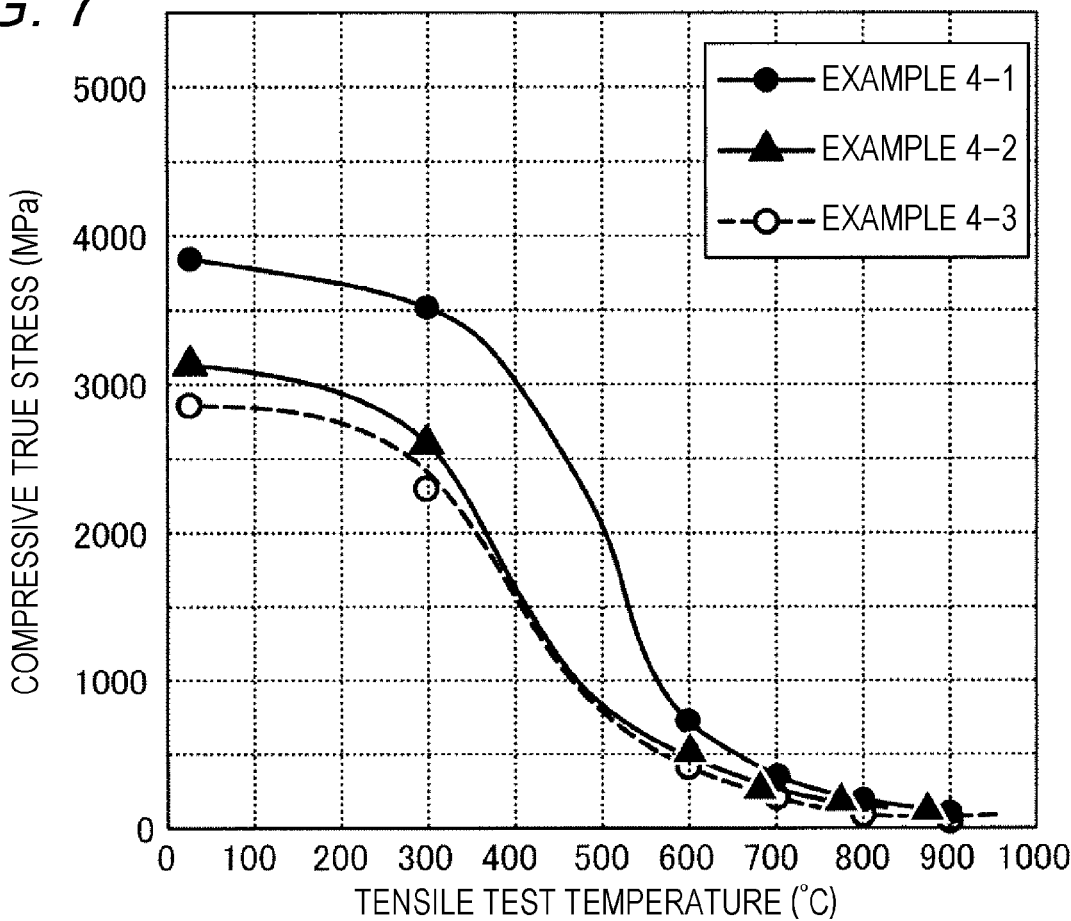
FIG. 7 is a diagram illustrating the test temperature dependency of tensile strength in an alloy structure related to Example 4.

FIG. 7 is a diagram illustrating the test temperature dependency of tensile strength in an alloy structure related to Example 4.

As illustrated in FIG. 7, it is found that the tensile strength in the alloy structures related to Example 4-1 to Example 4-2 in which the inevitable impurities are limited is improved as compared to the alloy structure related to Example 4-3 in which the inevitable impurities are not limited. Further, it is found that the tensile strength in the alloy structure related to Example 4-1 in which the inevitable impurities are further limited is improved at a wide temperature range. Therefore, it is found that a decrease in the concentration of inevitable impurities is effective for further improving the mechanical characteristics.

Then, as Examples of the present invention, alloy structures related to Example 5, Example 6, Example 7, and Example 8 were produced by changing the element type of the main component element, and the evaluation was performed thereon.

First, whether the solid solution phase of the high-entropy alloy can be formed by using iron (Fe) and other plural elements as main components was estimated by thermodynamic calculation. Incidentally, the thermodynamic calculation was performed by using the first principle calculation on the assumption that five or more elements including Fe are contained in such an element composition that the elements are contained at an equiatomic ratio, and then whether the solid solution phase can be formed with such an element composition under normal temperature and normal pressure was confirmed. Regarding main component elements, in addition to Fe, plural types of element are selected from the group consisting of elements from atomic number 3 to atomic number 83 included in Group 3 to Group 16 of the periodic table of the elements.

Figure 8:
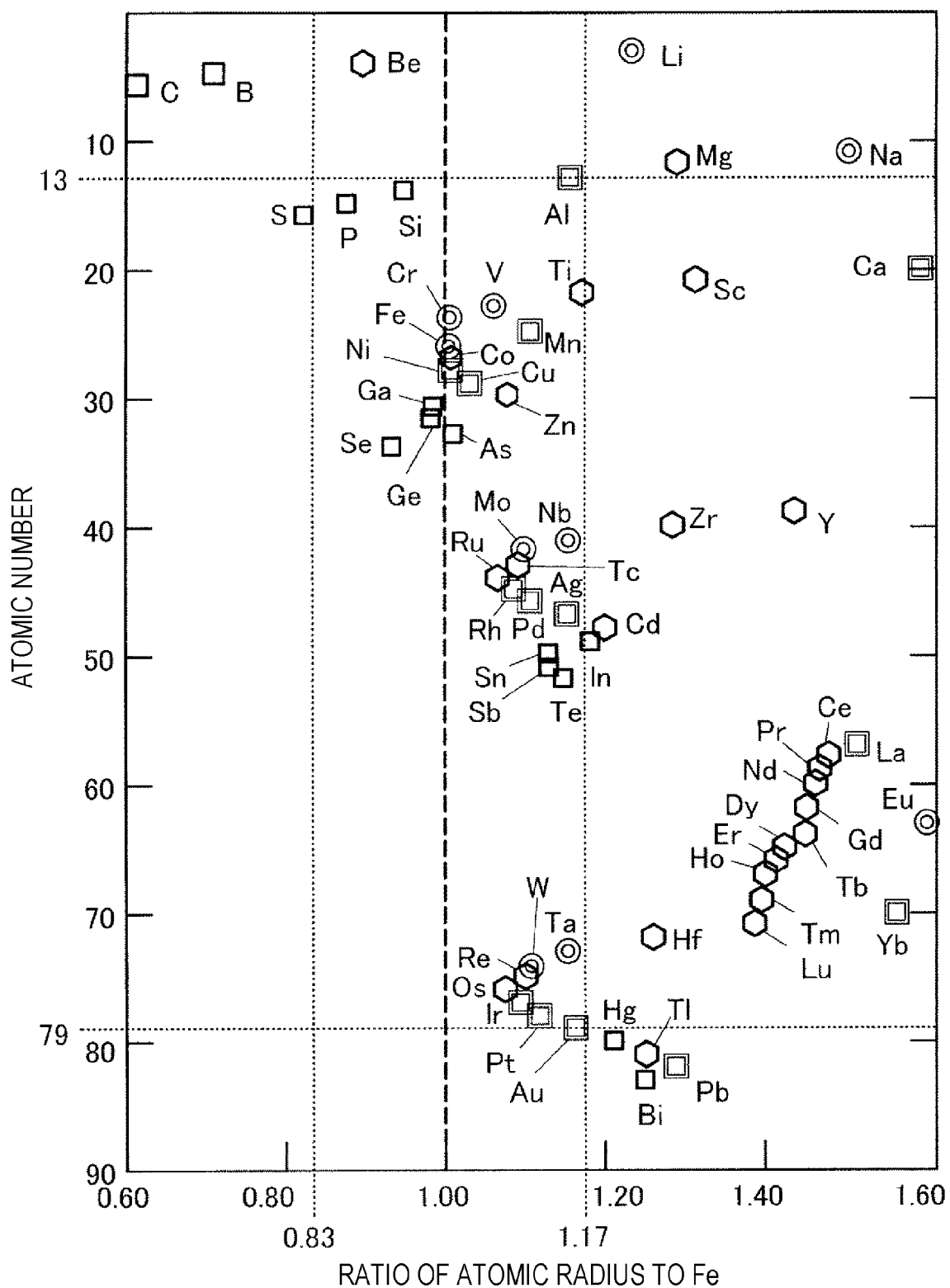
FIG. 8 is a diagram illustrating a range of a main component element with which a solid solution phase can be formed in the alloy structure.

FIG. 8 is a diagram illustrating a range of a main component element with which a solid solution phase can be formed in the alloy structure.

In FIG. 8, the vertical axis represents the atomic number of the element and the horizontal axis represents a ratio of the atomic radius to the Fe atom (the atomic radius of each element/the atomic radius of Fe). Further, the shape of each plot represents the crystalline structure under normal temperature and normal pressure. The double box represents a face-centered cubic lattice, the double circle represents a body-centered cubic lattice, the hexagon represents a hexagonal closest packing structure, and the square represents another crystal lattice.

When the thermodynamic calculation is performed on various combinations of main component elements, it is found that the element composition containing elements in the region surrounded by the dotted line in FIG. 8 at an equiatomic ratio can form the solid solution phase. Specifically, elements (non-Fe main component elements) which are recognized to be capable of being solid-dissolved with Fe are elements, which have a ratio of the atomic radius to the Fe atom of 0.83 or more but 1.17 or less, among Al of atomic number 13 to Au of atomic number 79, that is, are Al, Si, P, Ti, V, Cr, Mn, Co, Ni, Cu, Zn, Ga, Ge, As, Se, Nb, Mo, Tc, Ru, Rh, Pd, Ag, Sn, Sb, Te, Ta, W, Re, Os, Ir, Pt, Au. Further, as the component composition obtained from this combination, CoCrFeNiAl, CoCrFeNiCu, C oCrFeNiCuAl, CoCrFeNiCuAlSi, MnCrFeNiCuAl, CoCrFeNiMnGe, CoCrFeNiMn, CoCrFeNiMnCu, TiCoCrFeNiCuAlV, TiCoCrFeNiAl, AlTiCoCrFeNiCuVMn, TiCrFeNiCuAl, TiCoCrFeNiCuAl, CoCrFeNiCuAlV, TiCoCrFeNiAl, TiCoCrFeNiCuAl, CoCrFeNiCuAl, CoFeNiCuV, CoCrFeNiCuAl, MnCrFeNiAl, MoCrFeNiCu, TiCoCrFeNi, TiCoCrFeNiMo, CoCrFeNiCuAlV, MnCrFeNiCu, TiCoCrFeNi, TiCoCrFeNiAl, CoCrFeNiMo, CoCrFeNiAlMo, TiCoCrFeNiCu, CoCrFeNiCuAlMn, TiCoCrFeNiMo, CoCrFeNiCuAlV, TiCoCrFeNiCuVMn, AlTiCoCrFeNiCuVMn, CoCrFeNiCuAlMn, CoCrFeNiAlMo, CoCrFeNiCuAlMo, TiCoCrFeNiCu and the like were confirmed. Among these, a high-entropy alloy composed of nine elements of AlTiCoCrFeNiCuVMn was applied to manufacturing of the alloy structures related to Example 5, Example 6, Example 7, and Example 8.

Example 5

As Example 5, an alloy structure illustrated in FIG. 5 which has an element composition represented by AlTiCoCrFeNiCuVMn and in which the concentration of inevitable impurities is limited was produced by additive manufacturing. Regarding the atomic concentration ratio, a difference in the atomic concentrations of Al, Ti, Co, Cr, Fe, Ni, Cu, V, and Mn was adjusted within a range of ±3% so as to become a substantially equiatomic ratio. Further, the concentrations of P, Si, S, Sn, Sb, As, Mn, O, and N were limited to a range of 0.005 wt % to 0.002 wt %, a range of 0.040 wt % to 0.010 wt %, a range of 0.002 wt % to 0.001 wt %, a range of 0.005 wt % to 0.002 wt %, a range of 0.002 wt % to 0.001 wt %, a range of 0.005 wt % to 0.001 wt %, a range of 0.050 wt % to 0.020 wt %, a range of 0.001 wt % to 0.0003 wt %, and a range of 0.002 wt % to 0.001 wt %, respectively.

First, an alloy powder was prepared according to a gas atomizing method by using, as a base metal, an alloy in which the atomic concentration of each of Al, Ti, Co, Cr, Fe, Ni, Cu, V, and Mn was a substantially equiatomic ratio, and the concentrations of P, Si, S, Sn, Sb, As, Mn, O, and N were limited to 0.002 wt % or less, 0.010 wt % or less, 0.001 wt % or less, 0.002 wt % or less, 0.001 wt % or less, 0.001 wt % or less, 0.020 wt % or less, 0.0003 wt % or less, and 0.001 wt % or less, respectively. Then, the obtained alloy powder was classified such that the particle size distribution was limited to a range of 45 μm or more but 105 μm or less and the volume-based average particle size was adjusted to about 70 μm.

Subsequently, an alloy material was manufactured on a substrate by using an additive manufacturing apparatus. A plate-shaped mechanical structural carbon steel "S45C" having a size of 200 mm×200 mm×10 mm was used as the substrate. Further, an electron beam melting additive manufacturing apparatus "A2X" (manufactured by Arcam AB) using an electron beam as a heat source was used as the additive manufacturing apparatus. In the additive manufacturing apparatus, the powder extending step and the solidified layer manufacturing step were repeatedly performed on the substrate under vacuum atmosphere to manufacture an alloy structure. At this time, the melting of the alloy powder was carried out while the preliminary heating at a temperature of 50% to 80% of the melting point (Tm) of the alloy powder was carried out in advance, so that the scattering of the extended alloy powder was suppressed. The produced alloy structure related to Example 5 had substantially the same shape as that of the alloy structure illustrated in FIG. 5 and the volume of the entire manufactured object was 856700 mm$^3$.

Next, test pieces were collected from total 16 rectangular parallelepiped portions of the alloy structure related to Example 5 along the laminating direction, and then a uniaxial compression test was performed. Regarding the test pieces, dumbbell-shaped test pieces having the laminating direction of the alloy structure as a long axis were cut from each rectangular parallelepiped portion to the plate-shaped portion, the dimension of the parallel portion thereof was adjusted to have a size of 8 mm (diameter)×12 mm (height), and then the obtained dumbbell-shaped test pieces were used. In addition, the analysis of the Fe concentration distribution of the produced alloy structure related to Example 5 was performed. The analysis of the Fe concentration distribution was performed on total 16 rectangular parallelepiped portions by measuring the iron concentration in arbitrarily-extracted ten regions with a scanning electron microscope-energy dispersive X-ray detector.

As a result, it is found that regarding the average of the rectangular parallelepiped portions, all of the variation in the true stress-true strain curve and the Fe concentration distribution are within a difference range of 1 to 3%. Further, it can be found that the result of the standard deviation of 1.20% or less is obtained and the uniformity in the distribution of the element composition is increased. Furthermore, it is found that the element composition of the alloy structure related to Example 5 is substantially equal to the element composition of the used alloy powder, an error in component concentration is within about ±3%, unevenness caused by the element composition distribution, the melting rate, the cooling rate, or the like is solved, and the uniformity in the distribution of the element composition and the mechanical strength can also be secured.

Example 6

As Example 6, an arc-shaped alloy structure (see FIG. 9) which has an element composition represented by AlTiCoCrFeNiCuVMn and in which the concentration of inevitable impurities is limited was produced by additive manufacturing.

Figure 9:
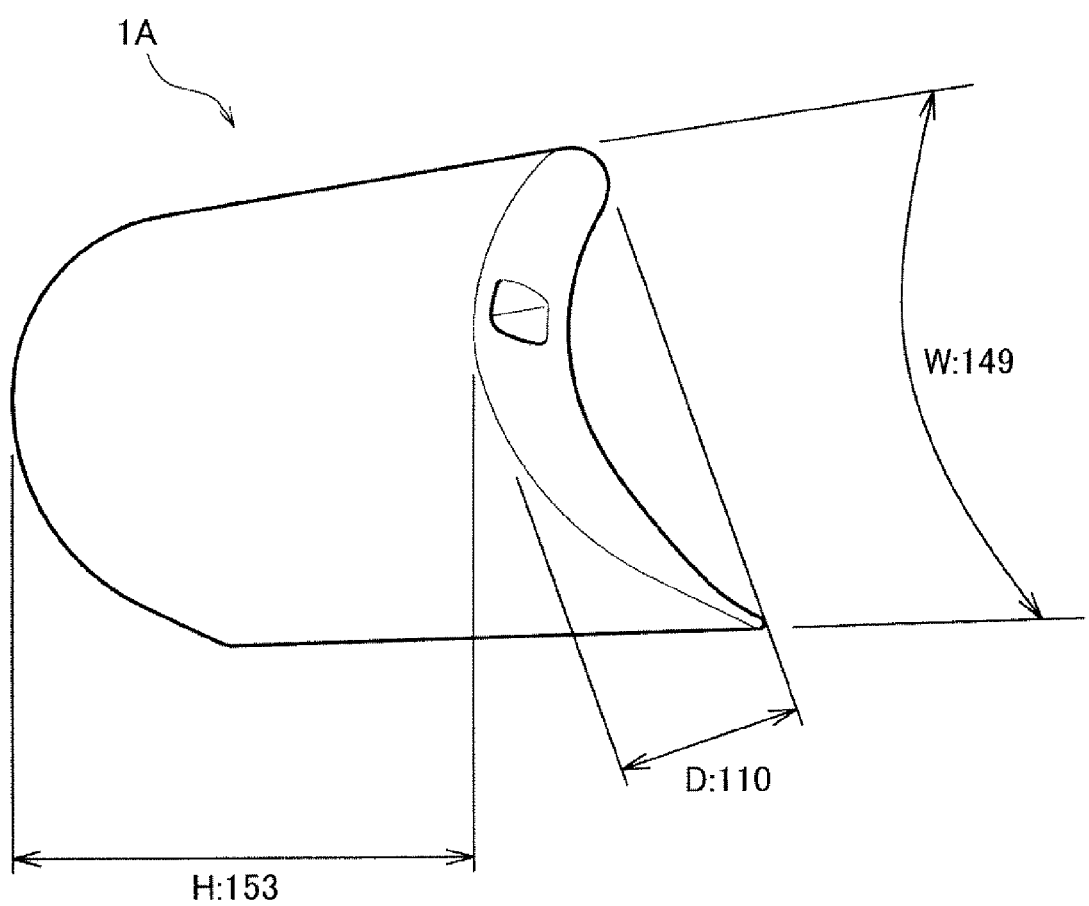
FIG. 9 is a diagram illustrating the shape dimension of an alloy structure related to Example 6.

FIG. 9 is a diagram illustrating the shape dimension of an alloy structure related to Example 6.

As illustrated in FIG. 9, an alloy structure 1A related to Example 6 is a column structure having an arc-shaped traverse section and has a shape which can be applied to a turbine blade, or the like. The alloy structure 1A having such a shape was produced in the same manner as in Example 5, except that the three-dimensional shape obtained by additive manufacturing was changed, and then the alloy structure was manufactured as an arc-shaped manufactured object having a size of 149 mm (width (W))×110 mm (depth (D))×153 mm (height (H)). The produced alloy structure related to Example 6 had a volume of the entire manufactured object of 184480 mm$^3$ and a surface area of 60470 mm$^2$, and could be formed in a volume about 33 times that of the alloy material described in NPL 2.

Next, the analysis of the Fe concentration distribution was performed on the alloy structure related to Example 6. The analysis of the Fe concentration distribution was performed by measuring the iron concentration in arbitrarily-extracted ten regions with a scanning electron microscope-energy dispersive X-ray detector.

As a result, it is found that the element composition of the alloy structure related to Example 6 is substantially equal to the element composition of the used alloy powder, an error in component concentration is within about ±3%, unevenness caused by the element composition distribution, the melting rate, the cooling rate, or the like is solved, and the uniformity in the distribution of the element composition and the mechanical strength can also be secured.

Example 7

As Example 7, a dumbbell-shaped alloy structure which has an element composition represented by AlTiCoCrFeNiCuVMn and in which the concentration of inevitable impurities is limited was produced by additive manufacturing.

The alloy structure related to Example 7 was produced in the same manner as in Example 4-1, except that the composition of a base metal used in preparation of the alloy powder and the three-dimensional shape obtained by additive manufacturing were changed, and then the alloy structure was formed as a dumbbell-manufactured object having a laminating direction of the solidified layer as a horizontal axis.

As a result, it is found that the element composition of the alloy structure related to Example 7 is substantially equal to the element composition of the used alloy powder, an error in component concentration is within about ±3%, unevenness caused by the element composition distribution, the melting rate, the cooling rate, or the like is solved, and the uniformity in the distribution of the element composition and the mechanical strength can also be secured. In addition, as compared to the alloy structure related to Example 4-1, it is found that the surface of the alloy structure related to Example 7 is flat and smooth, the metallic luster is strongly exhibited, and the effect of reforming the surface shape can be obtained by diversifying the element composition of the alloy structure.

Example 8

As Example 8, a rod-shaped alloy structure which has an element composition represented by AlTiCoCrFeNiCuVMn and in which the concentration of inevitable impurities is limited was produced by additive manufacturing.

The alloy structure related to Example 8 was manufactured in the same manner as in Example 4-1, except that the composition of a base metal used in preparation of the alloy powder and the three-dimensional shape obtained by additive manufacturing were changed.

As a result, it is found that the element composition of the alloy structure related to Example 8 is substantially equal to the element composition of the used alloy powder, an error in component concentration is within about ±3%, unevenness caused by the element composition distribution, the melting rate, the cooling rate, or the like is solved, and the uniformity in the distribution of the element composition and the mechanical strength can also be secured. The produced alloy structure related to Example 8 was used as a friction stirring tool, and welding was performed on a soft iron sheet material having a thickness of 10 mm or less by friction stir welding. As a result, it was possible to perform welding without defects occurring in the welding portion and to perform favorable welding with almost no warpage. That is, it is found that the diversified alloy structure related to Example 8 requires high-temperature strength and wear resistance and can be applied to friction stir welding of a material having Fe as a main component which is difficult to perform in the related art. Further, it was also found that when shaping processing or surface processing of the solidified portion or the solidified layer was performed in the solidified layer manufacturing step in a high temperature state until the solidified portion was formed, a manufactured object suitably subjected to processing can be obtained.

REFERENCE SIGNS LIST 1 alloy structure
10 alloy powder
15 substrate
20 melted portion
21 substrate mounting table
22 processing table
23 recoater
24 heating means
30 solidified portion
40 solidified layer
50 crystal grain
100 melting boundary
110 grain boundary (high-angle grain boundary)
120 low-angle grain boundary
301 electric furnace
302 metal ingot
303 arc discharge
304 electrode
305 oxygen burner
306 oxygen gas
309 ladle
310 molten metal
311 ladle smelting furnace
313 porous plug
314 argon gas
316 vacuum apparatus
317 exhaust hole
318 tundish
319 vacuum container
320 exhaust hole
324 electric furnace
326 molten alloy
330 chamber

The invention claimed is:

1. An alloy powder used for additive manufacturing, comprising Fe and at least four elements other than Fe, which are selected from the group consisting of elements from atomic number 13 to atomic number 79 included in Group 3 to Group 16 of the periodic table of the elements and have an atomic radius, a ratio of which to an Fe's atomic radius is larger than or equal to 0.83 and smaller than or equal to 1.17,
wherein the alloy powder is an atomized powder and has a particle size distribution within a range from 20 μm to 500 μm and wherein each of Fe and the at least four elements has an atomic concentration between 5 at % and 30 at %, and
wherein the alloy powder contains, as inevitable impurities, P: 0.002 wt % or more but 0.005 wt % or less, Si: 0.010 wt % or more but 0.040 wt % or less, S: 0.001 wt % or more but 0.002 wt % or less, Sn: 0.002 wt % or more but 0.005 wt % or less, Sb: 0.001 wt % or more but 0.002 wt % or less, As: 0.001 wt % or more but 0.005 wt % or less, Mn: 0.020 wt % or more but 0.050 wt % or less, O: 0.0003 wt % or more but 0.001 wt % or less, and N: 0.001 wt % or more but 0.002 wt % or less.

2. The alloy powder used for additive manufacturing according to claim 1, wherein the at least four elements are selected from the group consisting of Al, Si, P, Ti, V, Cr, Mn, Co, Ni, Cu, Zn, Ga, Ge, As, Se, Nb, Mo, Tc, Ru, Rh, Pd, Ag, Sn, Sb, Te, Ta, W, Re, Os, Ir, Pt, and Au.

3. The alloy powder used for additive manufacturing according to claim 1, wherein the Fe and at least four elements are Al, Co, Cr, and Ni.

4. The alloy powder used for additive manufacturing according to claim 1, wherein a difference in atomic concentration between at least four elements among the Fe and at least four elements is in a range of less than 3 at %.

5. The alloy powder used for additive manufacturing according to claim 1, wherein at least four elements among Al, Co, Cr, Fe, and Ni are contained in an atomic concentration range of 15 at % or more but 23.75 at % or less, and one element other than the four elements is contained in an atomic concentration range of 5 at % or more but 30 at % or less.

6. A method for producing the alloy powder of claim 1, the method comprising:
a melting step of melting a raw material metal ingot to generate molten metal;
a peroxidation step of blowing oxygen gas to the molten metal to form a slag;
a separation step of separating the slag floating on the liquid surface of the molten metal from the molten metal;
a degassing step of degassing a gas component in the molten metal by blowing argon gas to the molten metal separated from the slag;
a casting step of casting the degassed molten metal to form a casted alloy;
a step of melting the casted alloy in vacuum to form a molten alloy; and
a powderization step of forming an alloy powder by allowing the molten alloy to flow down and blowing inert gas to the molten alloy flowing down,
wherein the alloy powder contains five elements of Fe and at least four elements, which are selected from the group consisting of elements from atomic number 13 to atomic number 79 included in Group 3 to Group 16 of the periodic table of the elements and have a ratio of the atomic radius to an Fe atom of 0.83 or more but 1.17 or less.

7. The method for producing an alloy powder according to claim 6, wherein the at least four elements are selected from the group consisting of Al, Si, P, Ti, V, Cr, Mn, Co, Ni, Cu, Zn, Ga, Ge, As, Se, Nb, Mo, Tc, Ru, Rh, Pd, Ag, Sn, Sb, Te, Ta, W, Re, Os, Ir, Pt, and Au.

8. The method for producing an alloy powder used in melting additive manufacturing according to claim 6, wherein the five elements are Al, Co, Cr, Fe, and Ni.

9. The method for producing an alloy powder according to claim 6, wherein the alloy powder contains, as inevitable impurities, P: 0.005 wt % or less, Si: 0.040 wt % or less, S: 0.002 wt % or less, Sn: 0.005 wt % or less, Sb: 0.002 wt % or less, As: 0.005 wt % or less, Mn: 0.050 wt % or less, O: 0.001 wt % or less, and N: 0.002 wt % or less in terms of the atomic concentration range.

10. The method for producing an alloy powder according to claim 6, wherein the alloy powder contains, as inevitable impurities, P: 0.002 wt % or more but 0.005 wt % or less, Si: 0.010 wt % or more but 0.040 wt % or less, S: 0.001 wt % or more but 0.002 wt % or less, Sn: 0.002 wt % or more but 0.005 wt % or less, Sb: 0.001 wt % or more but 0.002 wt % or less, As: 0.001 wt % or more but 0.005 wt % or less, Mn: 0.020 wt % or more but 0.050 wt % or less, O: 0.0003 wt % or more but 0.001 wt % or less, and N: 0.001 wt % or more but 0.002 wt % or less in terms of the atomic concentration range.

11. The method for producing an alloy powder according to claim 6, wherein the alloy powder contains, as inevitable impurities, P: 0.002 wt % or less, Si: 0.005 wt % or less, S: 0.001 wt % or less, Sn: 0.002 wt % or less, Sb: 0.001 wt % or less, As: 0.001 wt % or less, Mn: 0.005 wt % or less, O: 0.0003 wt % or less, and N: 0.001 wt % or less in terms of the atomic concentration range.

12. The method for producing an alloy powder according to claim 6, wherein the powderization step is to melt the alloy in a vacuum furnace and a material constituting the vacuum furnace includes at least one of $SiO_2$, graphite, $Al_2O_3$, MgO, $ZrO_2$, TiC, ZrC, HfC, NbC, and TaC.

13. The method for producing an alloy powder according to claim 6, wherein the alloy powder contains each of the five elements in an atomic concentration of 5 at % or more but 30 at % or less.

14. The method for producing an alloy powder according to claim 6, wherein a difference in atomic concentration between at least four elements among the five elements in the alloy powder is in a range of less than 3 at %.

15. The method for producing an alloy powder according to claim 6, wherein at least four elements among Al, Co, Cr, Fe, and Ni are contained in an atomic concentration range of 15 at % or more but 23.75 at % or less, and one element other than the four elements is contained in an atomic concentration range of 5 at % or more but 30 at % or less.

* * * * *